US010111084B2

(12) United States Patent
Weniger et al.

(10) Patent No.: US 10,111,084 B2
(45) Date of Patent: *Oct. 23, 2018

(54) HOME AGENT DISCOVERY UPON CHANGING THE MOBILITY MANAGEMENT SCHEME

(71) Applicant: Sun Patent Trust, New York, NY (US)

(72) Inventors: Kilian Weniger, Langen (DE); Takashi Aramaki, Osaka (JP); Jun Hirano, Osaka (JP); Jens Bachmann, Langen (DE); Shinkichi Ikeda, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,818

(22) Filed: Feb. 12, 2018

(65) Prior Publication Data

US 2018/0184279 A1    Jun. 28, 2018

Related U.S. Application Data

(63) Continuation of application No. 15/457,793, filed on Mar. 13, 2017, now Pat. No. 9,930,518, which is a
(Continued)

(30) Foreign Application Priority Data

Feb. 18, 2008   (EP) .................................... 08002973

(51) Int. Cl.
*H04W 8/06* (2009.01)
*H04L 29/06* (2006.01)
(Continued)

(52) U.S. Cl.
CPC ......... *H04W 8/065* (2013.01); *H04L 61/2007* (2013.01); *H04L 63/029* (2013.01);
(Continued)

(58) Field of Classification Search
CPC ..... H04W 80/045; H04W 8/065; H04W 8/08; H04L 61/2007

See application file for complete search history.

(56) References Cited

U.S. PATENT DOCUMENTS 7,046,647 B2   5/2006   Oba et al.
7,299,044 B2   11/2007  Ikeda et al.
(Continued)

FOREIGN PATENT DOCUMENTS

CN   1640074 A   7/2005
CN   1929497 A   3/2007
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 8)," Technical Specification, 3GPP TS 23.401 V8.0.0, Dec. 2007, 167 pages.
(Continued)

*Primary Examiner* — Asad Nawaz
*Assistant Examiner* — Syed S Ali
(74) *Attorney, Agent, or Firm* — Seed IP Law Group LLP

(57) ABSTRACT

The invention relates to a method for discovering a home agent serving a mobile node upon the mobile node changing its mobility management scheme in a packet-switched network and the implementation of such method in a mobile node or home agent. In order to propose a home agent discover scheme that maintains session continuity in a seamless manner upon a mobile node changing its mobility management scheme, a mobile node comprises information on its location prior to changing the mobility management scheme to one of the first signaling messages transmitted upon changing the mobility management scheme (home
(Continued)

agent discovery message). The receiving node uses this information to identify the home agent serving the mobile node or to provide a hint to the home agent where the mobile node is registered in a response message to the mobile node.

4 Claims, 9 Drawing Sheets

Related U.S. Application Data continuation of application No. 15/227,893, filed on Aug. 3, 2016, now Pat. No. 9,635,539, which is a continuation of application No. 14/987,495, filed on Jan. 4, 2016, now Pat. No. 9,439,059, which is a continuation of application No. 13/962,862, filed on Aug. 8, 2013, now Pat. No. 9,288,658, which is a continuation of application No. 12/867,876, filed as application No. PCT/EP2009/001033 on Feb. 13, 2009, now abandoned.

(51) Int. Cl.
  *H04W 8/26* (2009.01)
  *H04W 80/04* (2009.01)
  *H04L 29/12* (2006.01)

(52) U.S. Cl.
  CPC ........ *H04L 63/0281* (2013.01); *H04L 63/061* (2013.01); *H04L 63/08* (2013.01); *H04L 63/10* (2013.01); *H04W 8/26* (2013.01); *H04L 61/6059* (2013.01); *H04W 80/04* (2013.01)

(56) References Cited

U.S. PATENT DOCUMENTS

| | | | |
|---|---|---|---|
| 7,461,169 | B2 | 12/2008 | Chandra et al. |
| 8,213,369 | B2 | 7/2012 | Ma |
| 2004/0095881 | A1 | 5/2004 | Borella et al. |
| 2004/0179539 | A1 | 9/2004 | Takeda et al. |
| 2004/0202126 | A1 | 10/2004 | Leung et al. |
| 2004/0240393 | A1 | 12/2004 | Nishida et al. |
| 2005/0163078 | A1 | 7/2005 | Oba et al. |
| 2006/0245362 | A1 | 11/2006 | Choyi |
| 2007/0189218 | A1 | 8/2007 | Oba et al. |
| 2007/0204155 | A1* | 8/2007 | Dutta ................ H04L 63/062 713/168 |
| 2007/0274266 | A1 | 11/2007 | Oyama et al. |
| 2008/0008129 | A1 | 1/2008 | Nagarajan et al. |
| 2008/0043614 | A1 | 2/2008 | Soliman |
| 2008/0095114 | A1* | 4/2008 | Dutta ................ H04W 12/06 370/331 |
| 2008/0165756 | A1 | 7/2008 | Ma |
| 2008/0198805 | A1 | 8/2008 | Weniger et al. |
| 2008/0219224 | A1 | 9/2008 | Balaji et al. |
| 2008/0282325 | A1 | 11/2008 | Oyama et al. |
| 2008/0291867 | A1 | 11/2008 | Weniger et al. |
| 2008/0310366 | A1 | 12/2008 | Oba et al. |
| 2009/0043901 | A1 | 2/2009 | Mizikovsky et al. |
| 2009/0109986 | A1* | 4/2009 | Zhao ................ H04L 29/12207 370/401 |
| 2009/0156213 | A1* | 6/2009 | Spinelli ................ H04W 92/02 455/436 |
| 2009/0238099 | A1 | 9/2009 | Ahmavaara |
| 2009/0238111 | A1 | 9/2009 | Hirano et al. |
| 2009/0307485 | A1 | 12/2009 | Weniger et al. |
| 2009/0313379 | A1 | 12/2009 | Rydnell et al. |
| 2010/0008319 | A1 | 1/2010 | Awano |
| 2010/0014464 | A1 | 1/2010 | Hirano et al. |
| 2010/0020747 | A1 | 1/2010 | Xia et al. |
| 2010/0061319 | A1 | 3/2010 | Aso et al. |
| 2010/0185849 | A1 | 7/2010 | Rune et al. |
| 2010/0202383 | A1 | 8/2010 | Sugimoto et al. |
| 2010/0241737 | A1 | 9/2010 | Hirano et al. |
| 2010/0265846 | A1 | 10/2010 | Weniger |
| 2010/0281148 | A1 | 11/2010 | Turanyi et al. |
| 2010/0313024 | A1 | 12/2010 | Weniger et al. |
| 2011/0238822 | A1* | 9/2011 | Weniger ............. H04W 80/045 709/224 |
| 2011/0286384 | A1 | 11/2011 | Sugimoto et al. |
| 2011/0299463 | A1 | 12/2011 | Bachmann et al. |
| 2012/0044949 | A1* | 2/2012 | Velev ................... H04W 8/082 370/401 |

FOREIGN PATENT DOCUMENTS

| | | |
|---|---|---|
| CN | 1969568 A | 5/2007 |
| EP | 1 777 908 A1 | 4/2007 |
| EP | 1 933 503 A1 | 6/2008 |
| WO | 02/071720 A1 | 9/2002 |
| WO | 2006/035261 A1 | 4/2006 |
| WO | 2007/028300 A1 | 3/2007 |

OTHER PUBLICATIONS

"3rd Generation Partnership Project; Technical Specification Group Services and System Aspects; Architecture enhancements for non-3GPP accesses (Release 8)," Technical Specification, 3GPP TS.23.402 V8.0.0, Dec. 2007, 131 pages.
Aboba et al., "The Network Access Identifier," Network Working Group, Request for Comments: 4282, Obsoletes: 2486, Category: Standards Track, Dec. 2005, 14 pages.
Arkko et al., "Using IPsec to Protect Mobile IPv6 Signaling Between Mobile Nodes and Home Agents," Network Working Group, Request for Comments: 3776, Category: Standards Track, Jun. 2004, 40 pages.
Arkko et al., "Extensible Authentication Protocol Method for 3rd Generation Authentication and Key Agreement (EAP-AKA)," Network Working Group, Request for Comments: 4187, Category: Informational, Jan. 2006, 70 pages.
Carstens, "Concept and Method for Home Agent Discovery in 3GPP-WLAN Environment/Information/Communication," Siemens AG, IPCOM000133694D, Mar. 1, 2006, 4 pages.
Chinese Office Action dated Oct. 23, 2015, for corresponding CN Application No. 201310411230.2, 8 pages. (W/ English Translation).
Chowdhury et al., "MIP6-bootstrapping for the Integrated Scenario," Network Working Group, Internet-Draft, Intended Status: Standards Track, Jun. 20, 2007, 18 pages.
Devarapalli et al., "Mobile IPv6 Operation with IKEv2 and the Revised IPsec Architecture," Network Working Group, Request for Comments: 4877, Updates: 3776, Category: Standards Track, Apr. 2007, 26 pages.
Droms et al., "Dynamic Host Configuration Protocol for IPv6 (DHCPv6)," Network Working Group, Request for Comments: 3315, Category: Standards Track, Jul. 2003, 89 pages.
Dupont et al., "IKEv2-based Home Agent Assignment in Mobile IPv6/NEMO Bootstrapping," Network Working Group, Internet-Draft, Jan. 31, 2007, 6 pages.
Extended European Search Report, dated Feb. 17, 2014, for corresponding European Application No. 13176654.5-1856, 5 pages.
Giaretta et al., "Mobile IPv6 Bootstrapping in Split Scenario," Network Working Group, Request for Comments: 5026, Category: Standards Track, Oct. 2007, 28 pages.
Gundavelli et al., "Proxy Mobile IPv6," NETLMM WG, Internet-Draft, Intended Status: Standards Track, Feb. 25, 2008, 80 pages.
International Search Report, dated Jul. 3, 2009, for International Application No. PCT/EP2009/001033, 3 pages.
Jang et al., "DHCP Option for Home Information Discovery in MIPv6," MIP6 Working Group, Internet-Draft, Intended Status: Standards Track, Jan. 7, 2008, 21 pages.
Johnson et al., "Mobility Support in IPv6," Network Working Group, Request for Comments: 3775, Category: Standards Track, Jun. 2004, 165 pages.
Kaufman, "Internet Key Exchange (IKEv2) Protocol," Network Working Group, Request for Comments: 4306, Obsoletes: 2407, 2408, 2409, Category: Standards Track, Dec. 2005, 87 pages.

(56) References Cited

OTHER PUBLICATIONS

Leung et al., "WiMAX Forum/3GPP2 Proxy Mobile IPv4," MIP4, Internet-Draft, Intended Status: Informational, Feb. 13, 2008, 36 pages.

Office Action, dated Mar. 12, 2013, for corresponding Chinese Application No. 200980113637.9, 7 pages. (W/ English Translation).

Patel et al., "Authentication Protocol for Mobile IPv6," Network Working Group, Request for Comments: 4285, Category: Informational, Jan. 2006, 17 pages.

Zhao, "DHCP option for MIP type Decision," Network Working Group, Internet-Draft, Intended Status: Standards Track, Feb. 25, 2007, 12 pages.

* cited by examiner

HOME AGENT DISCOVERY UPON CHANGING THE MOBILITY MANAGEMENT SCHEME

BACKGROUND

Technical Field

The invention relates to a method and mobile node for discovering a home agent serving a mobile node upon the mobile node changing its mobility management scheme in a packet-switched network. Furthermore, the invention relates to a home agent supporting the mobile node in discovering its serving home agent upon changing the mobility management scheme.

Description of the Related Art

Communications systems evolve more and more towards an Internet Protocol (IP)-based network. They consist of many interconnected networks, in which speech and data is transmitted from one terminal to another terminal in pieces, so-called packets. Packets are routed to the destination by routers in a connection-less manner. Therefore, IP packets consist of IP header and payload information and the header comprises among other things source and destination IP address. For scalability reasons a large IP network is usually divided in subnets and uses a hierarchical addressing scheme. Hence, an IP address does not only identify the corresponding terminal, but additionally contains location information (current subnet) about this terminal. Typically this location information is also referred to as the prefix of the IP address. With additional information provided by routing protocols, routers in the packet-switched network are able to identify the next router towards a specific destination.

If a terminal is mobile, a so-called Mobile Node (MN), and moves between subnets, it must change its IP address to a topological correct address using the prefix of the subnet (domain) because of the hierarchical addressing scheme (if no other mechanism is provided allowing the mobile node to keep its address—see the discussion of Proxy Mobile IP below). However, since connections on higher-layers such as TCP connections on the transport layer of the OSI model are defined with the IP addresses (and ports) of the communicating nodes, the connection breaks, if one of the nodes changes its IP address, e.g., due to movement.

Mobile IPv6

Mobile IPv6 (MIPv6) as specified by Johnson et al., "Mobility Support in IPv6", IETF RFC 3775, June 2004 (available at http://www.ietf.org and incorporated herein by reference) is an IP-based mobility protocol that enables mobile nodes to move between subnets in a manner transparent for higher layers and applications, i.e., without breaking higher-layer connections. Therefore, a mobile node has two IP addresses configured: a care-of address (CoA) and a home address (HoA). The mobile node's higher layers use the home address for communication with the communication partner, who is associated with the destination terminal, the so-called corresponding node (CN). This address does not change and serves the purpose of identification of the mobile node. Topologically, the home address belongs to the home network (HN) of the mobile node.

In contrast, the care-of address changes on every movement that results in a subnet change (new prefix being advertised) and is used as the locator for the routing infrastructure. Topologically, the care-of address belongs to the network the mobile node is currently attached to. One out of a set of anchors, so-called home agents (HA), located on the home link maintains a mapping of the mobile node's care-of address to mobile node's home address and redirects incoming traffic for the mobile node to its current location. Reasons for having a set of home agents instead of a single home agent are redundancy and load balancing.

Mobile IPv6 currently defines two modes of operation: bi-directional tunneling and route optimization. If bi-directional tunneling is used, data packets sent by the corresponding node and addressed to the home address of the mobile node are intercepted by the home agent in the home network and tunneled to the care-of address of the mobile node. Data packets sent by the mobile node are reverse tunneled to the home agent, which decapsulates the packets and sends them to the corresponding node. For this operation, the home agent must be informed about the current location (i.e., the care-of address) of the mobile node. Therefore, the mobile node sends location updates messages, which are called binding update (BU) messages in MIPv6, to the home agent. Binding update messages contain a sequence number, so that the home agent can identify the freshness and correct ordering of binding update messages. These binding update messages are sent over an IPsec security association and thus are cryptographically protected to provide data origin authentication and integrity protection. This requires that mobile node and home agent share a secret key. Hence, the home agent only accepts binding update messages for the mobile node's home address that are cryptographically protected with the corresponding shared key.

Extensions to Mobile IPv6

Recently, Mobile IPv6 has been extended to enable mobile nodes to dynamically bootstrap with home agents (see Giaretta et al., "Mobile IPv6 bootstrapping in split scenario", RFC 5026, October 2007, available at http://www.ietf.org and incorporated herein by reference). Bootstrapping includes discovering a home agent, setting up the security associations with the home agent for securing the Mobile IP signaling and configuring a corresponding home address.

An IPsec security association may be dynamically established using IKEv2. IKEv2 is defined in Kaufman, "Internet Key Exchange (IKEv2) Protocol", IETF RFC 4306, December 2005; Arkko et al., "Using IPsec to Protect Mobile IPv6 Signaling Between Mobile Nodes and Home Agents", IETF RFC 3776, June 2004 and Devarapalli et al., "Mobile IPv6 Operation with IKEv2 and the Revised IPsec Architecture", IETF RFC 4877, April 2007 (all three documents being available at http://www.ietf.org and being incorporated herein by reference). Another protocol allowing the establishment of a security association for securing the Mobile IP signaling is the authentication protocol by Patel et al., "Authentication Protocol for Mobile IPv6", IETF RFC 4285, January 2006, available at http://www.ietf.org and incorporated herein by reference.

Multiple methods exist for discovering a home agent by the mobile node: One option is that the mobile node is pre-configured with a DNS name for the home agent and queries DNS (Domain Name System) to get a list of home agent IP addresses (see Giaretta et al., "Mobile IPv6 bootstrapping in split scenario", RFC 5026, October 2007 available at http://www.ietf.org and incorporated herein by reference). Another option is that the mobile node is pre-configured with an anycast home agent address suffix and sends an DHAAD message (see IETF RFC 3775) or an IKE_SA_INIT message via anycast to a group of home agents (see Dupont et al., "IKEv2-based Home Agent Assignment in Mobile IPv6/NEMO Bootstrapping", IETF Internet Draft, draft-dupont-ikev2-haassign-02.txt, January 2007 available at http://www.ietf.org and incorporated herein by reference). The prefix for the anycast home agent address can be pre-configured on the mobile node or dynamically obtained from the network. Further, it can be equal to the mobile node's home address prefix.

With the anycast concept, multiple home agents have the same anycast address assigned and a message sent to this anycast is delivered to any of the home agents that are part of the anycast group. Typically the message is delivered to the home agent that is located closest to the sender. DNS-based and anycast-based home agent discovery can also be combined. Therefore, the mobile node is pre-configured with a DNS name and DNS returns an anycast address. FIG. 1 shows an example of home agent discovery using IKE anycasting.

In a deployment scenario, where the access network operator and the home network operator are the same or have a trust relationship, a home agent address for the mobile node can be assigned by the home or visited network, delivered to the access network via the AAA protocol and assigned to the mobile node using the DHCP protocol. With this approach, the mobile node queries the DHCP server to obtain a home agent IP address (see Chowdhury et al., "MIP6-bootstrapping for the Integrated Scenario", IETF Internet Draft, draft-ietf-mip6-bootstrapping-integrated-dhc-05.txt, June 2007 and Hee Jin Jang et al., "DHCP Option for Home Information Discovery in MIPv6", IETF Internet Draft, draft-ietf-mip6-hiopt-10.txt, January 2008 both available at http://www.ietf.org and incorporated herein by reference).

Client-Based Versus Network-Based Mobility Management

Mobile IP is a host- or client-based protocol, since the mobility management signaling is between the host/client and the home agent. Hence, MIP is also sometimes called Client Mobile IP (Client MIP or CMIP).

Another approach becoming popular is a network-based approach for IP mobility management. An entity in the visited access network acts as a proxy for the mobile node and manages the mobility for the mobile node, including the signaling of location updates to the home agent. Network-based mobility management is considered to have some advantages like less signaling overhead over the air and mobility support for simple IP nodes (i.e., non-Client MIP-capable nodes). A commonly identified drawback is that it requires support from the visited access network.

The IETF (Internet Engineering Task Force) is working on such approach for localized mobility management based on the Mobile IP protocol. Since a network entity is acting as a proxy on behalf of the mobile node, the protocol is called Proxy Mobile IP (Proxy MIP or PMIP). There are variants for IPv6 called PMIPv6 (see Gundavelli et al., "Proxy Mobile IPv6", IETF Internet Draft, draft-ietf-netlmm-proxymip6-10.txt, February 2008, available at http://www.ietf.org and incorporated herein by reference) and variants for IPv4 called Proxy MIPv4 (see Leung et al., "WiMAX Forum/3GPP2 Proxy Mobile IPv4", IETF Internet Draft, draft-leung-mip4-proxy-mode-07.txt, February 2008 available at http://www.ietf.org and incorporated herein by reference).

PMIPv6 introduces a new logical entity called mobile access gateway (MAG), which is typically co-located with the access router (AR) the mobile node is currently attached to and which sends binding update messages on behalf of a mobile node. The Proxy MIP-home agent is an extended Client MIP-home agent anchor and is called local mobility anchor (LMA). Since a local mobility anchor includes home agent functionality, the local mobility anchor is sometimes also denoted a home agent herein. Binding update messages sent by the mobile access gateway are marked with a flag, so that they can be identified as proxy binding update (PBU) messages by the local mobility anchor and can be distinguished from binding update messages sent by the mobile node (i.e., CMIP signaling messages).

Furthermore, proxy binding update messages contain, among others, a network access identifier (NAI) option, a home prefix option, and a timestamp option. The NAI option contains the NAI (as specified in Aboda et al., "The Network Access identifier", IETF RFC 4282, December 2005, available at http://www.ietf.org and incorporated herein by reference) of the mobile node, which has the form of "username@realm" and which is used to identify the mobile node.

The home prefix option contains the home address or home prefix of the mobile node. In Proxy MIPv6, every mobile node typically gets a unique prefix assigned. When the mobile node attaches to a new mobile access gateway, the mobile access gateway sends a proxy binding update to the local mobility anchor to register the mobile node's new location. The proxy binding update can be triggered, e.g., by a successful network authentication, by DHCP (Dynamic Host Configuration Protocol) messages or others. Further, the mobile access gateway announces the mobile node's home prefix to the mobile node. Consequently, the mobile node's IP stack thinks it is at home as long as it moves within the Proxy MIP domain and does not notice that it changes subnets. A tunnel between local mobility anchor and mobile access gateway is established and all traffic from/to the mobile node is forwarded through this tunnel.

The 3GPP SAE system (see 3GPP TS 23.401, "General Packet Radio Service (GPRS) enhancements for Evolved Universal Terrestrial Radio Access Network (E-UTRAN) access", version 8.0.0 and 3GPP TS 23.402, "Architecture enhancements for non-3GPP accesses", version 8.0.0 both available at http://www.3gpp.org and incorporated herein by reference) specifies both (Client) MIPv6 and Proxy MIPv6 for mobility management for handovers between access technologies. The home agent and local mobility anchor functions are part of the public data network gateway (PDN-GW), the mobile node functions are part of the user equipment (equivalent to a mobile node) and the mobile access gateway functions are part of the evolved Packet Data Gateway (ePDG), access gateway and access routers of non-3GPP networks. The equivalent terms are used interchangeably in the following.

The 3GPP SAE system defines different types of access networks: a 3GPP access network provides network access to the terminal using 3GPP radio technologies like GSM/GPRS, UMTS, LTE, whereas a non-3GPP access network provides network access using non-3GPP radio technologies like WLAN, WiMax, CDMA2000, etc. Non-3GPP access networks can further be divided in trusted and un-trusted non-3GPP access networks, depending on the level of trust by a 3GPP operator. A terminal located in a trusted non-3GPP access network can directly access 3GPP services like the Mobile IPv6 service provided by the PDN-GW, whereas a terminal located in a untrusted non-3GPP access network may only access 3GPP services when over an ePDG. The ePDG is similar to a VPN server in the sense that the terminal first needs to authenticate at the ePDG and then all the traffic to/from the terminal is sent integrity and confidentiality protected over a secure IPsec tunnel to the ePDG. A terminal typically discovers an ePDG address using DNS and sets up the IPsec tunnel using IKEv2.

It is possible that some access networks support PMIP and others do not. Hence, the mobility management for a mobile node can transition from PMIPv6 to MIPv6 or vice versa during a session. If a mobile node transitioning from a domain with network-based mobility management to a domain with host-based mobility management, the mobile node needs to discover and register with the anchor (home agent) that was used before by the network in order to be able to ensure session continuity. Since the mobile node is typically unaware of its home agent when the mobility is managed by the network, the mobile node needs to discover the specific home agent as quickly as possible in order to prevent noticeable interruptions in the data service, at least if the discovery cannot be done before the handover in a predictive way, e.g., because the mobile node suddenly ran out of coverage. Furthermore, it should not be possible for a node to identify the home agent that serves another mobile node. Otherwise, an off-path attacker can mount targeted denial of service (DoS) attacks against the home agent of a specific mobile node.

BRIEF SUMMARY

One object of the invention is to propose a home agent discover scheme that maintains session continuity in a seamless manner upon a mobile node changing its mobility management scheme.

The object is solved by the subject matter of the independent claims. Advantageous embodiments of the invention are subject matters of the dependent claims.

The main aspect of the invention is that the mobile node reveals information about its previous movement or location (such as previous points of attachment) to the network during the anchor (home agent) discovery process. If a home agent discovery message from the mobile node is received by a home agent or home agent discovery server, the home agent or home agent discovery server can return hints to the mobile node that help the mobile node discovering the correct anchor (i.e., the home agent where the mobile node is registered prior to the change of the mobility management scheme).

In some cases the hints in the response message may already be sufficient to uniquely identify the serving home agent so that the further home agent discovery message by the mobile node will be received at the correct home agent. If this is not the case, the home agent may also return a response message including hints to the mobile node that help the mobile node discovering the correct anchor, and the mobile node may use these new hints in sending a further home agent discovery message. In general, the hints in the response message may for example be determined by the home agent (discovery server) based on the information about previous locations of the mobile node as included by the mobile node in the home agent discovery message.

According to one exemplary embodiment of the invention a method for discovering a home agent serving a mobile node upon the mobile node changing its mobility management scheme in a packet-switched network is provided. In this method, the mobile node transmits a home agent discovery message to a home agent discovery server. The home agent discovery message comprises information on the mobile node's location prior to changing the mobility management scheme. The mobile node further receives from the home agent discovery server a response message with information helping the mobile node to discover the home agent serving the mobile node. The mobile terminal transmits another home agent discovery message to a home agent based on the information comprised in the response message received from the home agent discovery server.

The home agent discovery server may be for example a home agent, a NAS/DHCP server, a trusted packet data gateway in the core network such as a an Evolved Packed Data Gateway in a 3GPP-based network, etc.

It should be noted that the transmission of a home agent discovery message to a home agent or a home agent discovery server does not necessarily imply that the destination identified in the home agent discovery message is a unique identifier of the home agent or home agent discovery server, respectively. In an exemplary variation of this embodiment the mobile node uses an anycast address, a multicast address or a unicast address as the destination address of the home agent discovery message transmitted to the home agent or home agent discovery server. Hence, the home agent discovery message may be for example sent to a group address that identifies plural nodes or to an address uniquely identifying a specific node in the packet-switched network.

In a further exemplary variation of the embodiment, the home agent discovery server and/or a home agent receiving a home agent discovery message determines the information to be comprised in the response message based on the location information provided by the mobile node in its home agent discovery message.

In another embodiment of the invention the mobile node derives the destination address for the (next) home agent discovery message from the information comprised in the response message received from the home agent discovery server or another home agent that has received a mobile node's home agent discovery message. For example the information comprised in the response message could be redirection information indicating or allowing the mobile node to derive an anycast group address, multicast group address or a unicast address of a home agent to which the next home agent discovery message is destined. In a further example, the anycast group address or the unicast address may be an address of temporary validity and/or is configured for use by the mobile node or a group of mobile nodes only. Hence, the mobile node may use the address provided in the response message as the destination address for the next home agent discovery message.

It should be noted that the information of the response message received at the mobile node in response to a home agent discovery message do not necessarily have to be a (routable) address. In another exemplary embodiment, the information may include hints that allow the mobile node to derive a valid address (e.g., an anycast group address, multicast group address or a unicast address as mentioned above) from the hints comprised in the response. Such hints may be for example a subnet address prefix or a (part of) a DNS domain name.

Furthermore, in another exemplary embodiment of the invention, not only the first home agent discovery message transmitted by the mobile node upon changing the mobility management scheme may comprise location information, but also (a) subsequently transmitted home agent discovery message(s) transmitted by the mobile node may comprise information on the mobile node's location prior to changing the mobility management scheme. The content of the home agent discovery message may for example depend on whether the mobile node is capable to derive its serving home agent from the information comprised in a response message to a previously transmitted home agent discovery message. If for example a unicast address identifying a single home agent is included in a response, the mobile node may for example assume that the identified home agent is the home agent to serve the mobile node and may therefore not include location information to the home agent discovery message.

In a further embodiment of the invention, a home agent that has received a home agent discovery message from the mobile node, but that is not the serving home agent where the mobile node is registered transmits a response message comprising information helping the mobile node to discover the home agent serving the mobile node or indicating that the other mobile node is the home agent serving the mobile node.

In a further exemplary embodiment the home agent discovery messages and the response messages thereto are messages of an authentication procedure for authenticating the mobile node. For example, the authentication procedure may be a procedure for establishing a security association between the mobile node and the respective home agent. In a variation of this exemplary embodiment the mobile node may continue the authentication procedure and update its binding (e.g., by means of a binding update) within the packet-switched network with a home agent, if the home agent indicates in its response message to a home agent discovery message that it is the home agent serving the mobile node.

In a further embodiment of the invention, the home agent discovery message sent to the home agent discovery server is a DHCP information request message that is including additional location information. Accordingly, the home agent discovery server in this exemplary embodiment is a DHCP server that is responding to the DHCP request message by a DHCP information reply comprising a hint helping the mobile node discovering the correct home agent.

In another embodiment of the invention, the home agent discovery message sent to the home agent discovery server is a binding update including an authentication option that is extended with location information. Accordingly, the home agent discovery server in this exemplary embodiment is a home agent and its response message is a binding acknowledgement additionally including a hint helping the mobile node discovering the correct home agent.

As already indicated above, in one exemplary embodiment, the mobile node may repeatedly transmit home agent discovery messages to other home agents until a terminating condition is reached. Such terminating condition may be for example a home agent indicating in a response message to be the home agent serving the mobile node, or a threshold number of repetitions being reached or a response message yields a destination for a next home agent discovery message that has already proven not to be the home agent where the mobile node is registered (e.g., if a response message contains an address that has already been used as a destination address for a previous home agent discovery message).

In a further embodiment of the invention, either one or all of the home agent discovery messages transmitted by the mobile node comprise a temporary identifier of the mobile node. The mapping of this temporary identifier to a corresponding non-temporary identifier of the mobile node is only known to home agent (discovery server) and mobile node.

In a variation of the embodiment, a home agent (which could be also the home agent discovery server) receiving a home agent discovery message may search a binding cache entry of the mobile node using the temporary or non-temporary identifier of the mobile node. Examples of a non-temporary identifier of the mobile node are the mobile node's NAI (Network Access Identifier) or address. An example for a temporary identifier is for example the TMSI (Temporary Mobile Subscriber Identity)—if implementing the invention in a 3GPP based mobile communication system such as UMTS or LTE/SAE—or a pseudo NAI. A pseudo NAI uses a pseudonym username in the username part of the NAI (see Arkko et al., "Extensible Authentication Protocol Method for 3rd Generation, Authentication and Key Agreement (EAP-AKA)", IETF RFC 4187, section 4.1.1.9, available at http://www.ietf.org and incorporated herein by reference) In another example, the temporary identifier could be created by using the TMSI as part of the NAI.

In another variation of this embodiment, the home agent having received a home agent discovery message responds to the home agent discovery message by transmitting a response message including information helping the mobile node to discover the home agent serving the mobile node, if there is no binding cache entry for the mobile node in the binding cache of the home agent. Otherwise, the home agent indicates by means of a response message that it is the home agent having served the mobile node prior to the mobile node changing the mobility management scheme.

In another exemplary embodiment of the invention the home agent discovery server is located in a domain in which a client-based mobility management scheme is used. Further, the home agent(s) receiving a home agent discovery message from the mobile node may be located in another domain providing a network-based mobility management scheme.

In one further exemplary embodiment of the invention, the trigger for the mobile node changing the mobility management scheme is a handover of the mobile node from one domain supporting a network-based mobility scheme to another domain supporting a client-based mobility scheme, or vice versa.

As indicated previously, in some embodiments of the invention, the home agent discovery messages and the response messages thereto are messages of an authentication procedure for authenticating the mobile node. If the information comprised in the response message is information helping the mobile node to discover another home agent (i.e., the response from a home agent indicates that it is not the home agent serving the mobile node), the authentication procedure is restarted based on the information comprised in a response message to a home agent address message.

Another embodiment of the invention relates to a mobile node for discovering a home agent serving the mobile node upon the mobile node changing its mobility management scheme in a packet-switched network. The mobile node comprises a transmitter for transmitting a home agent discovery message to a home agent discovery server, wherein the home agent discovery message comprises information on the mobile node's location prior to changing the mobility management scheme, and a receiver for receiving from the home agent a response message comprising information helping the mobile node to discover the home agent serving the mobile node. The mobile node's transmitter is capable of transmitting another home agent discovery message to another home agent based on the information comprised in the response message received from the home agent discovery server.

The mobile node according to a further embodiment of the invention comprises a processing unit for deriving by the mobile node the destination address for the home agent discovery message from the information comprised in the response message received from the home agent discovery server (or a home agent). In a variation of this embodiment, the mobile node uses the address provided in the response message as the destination address for the (next) home agent discovery message transmitted to another) home agent.

According to a further embodiment of the invention, the mobile node's processing unit continuously determines information related to the location of the mobile node and stores the location information in a storage comprised by the mobile node. In one exemplary implementation, the mobile node stores location information determined since the last change of the mobility management scheme. Location information may for example be an identifier of the mobile access gateway to which the mobile node attached initially, a record of mobile access gateway identifiers to which the mobile node has been attached while travelling in the network, a record of GPS locations that are determined by a GPS receiver of the mobile node on a regular or event-triggered basis, etc. Accordingly, the term continuously should not be misunderstood as relating to only a permanent recording of location related information, but may also encompass an event-triggered or regular, timer-based establishment of location information.

Further, in one embodiment of the invention the mobile node causes its transmitter to repeat the transmission of a home agent discovery message to other home agents until a home agent indicates in a response message to be the home agent serving the mobile node or another terminating condition is reached (e.g., a maximum number of transmissions of a home agent discovery message).

Another embodiment of the invention relates to a home agent for use in a packet-switched network. The home agent comprises a receiver for receiving from a mobile node a home agent discovery message that comprises information on the mobile node's location prior to changing the mobility management scheme. The home agent further includes a binding cache (e.g., a storage) for maintaining (storing) bindings of plural mobile nodes served by the home agent and a processing unit for determining whether a binding cache entry exists for the mobile node from which the home agent discovery message has been received.

The processing unit may be further designed to determine, based on the location information comprised in the home agent discovery message, information helping the mobile node to discover the home agent serving the mobile node, if no binding cache entry exists for the mobile node. The home agent may further be capable of causing a transmitter of the home agent to transmit a response message comprising the information helping the mobile node to discover the home agent serving the mobile node to the mobile node from which the home agent discovery message has been received.

In a further embodiment, the home agent's processing unit is adapted to determine an anycast group address, multicast group address or a unicast address of another home agent (or group of home agents) based on the location information received from the mobile node.

In one exemplary embedment, the home agent is located in the core network of a mobile communication system, such as a 3GPP based mobile communication network.

Another embodiment of the invention relates to a packet-switched communication network comprising a mobile node according and/or at least one home agent according to one of the different embodiments described herein.

A further embodiment of the invention provides a computer-readable medium storing instructions that, when executed by a processor of a mobile node, cause the mobile node upon the mobile node changing its mobility management scheme in a packet-switched network to discover a home agent serving a mobile node. The mobile node is caused to discover its serving home agent by transmitting a home agent discovery message to a home agent discovery server, wherein the home agent discovery message comprises information on the mobile node's location prior to changing the mobility management scheme, receiving from the home agent discovery server a response message comprising information helping the mobile node to discover the home agent serving the mobile node, and transmitting another home agent discovery message to another home agent based on the information comprised in the response message received from the home agent discovery server.

Another embodiment of the invention relates to a computer-readable medium storing instructions that, when executed by a home agent, cause the home agent to provide a mobile node with information helping the mobile node to discover the home agent serving the mobile node, by receiving a home agent discovery message from the mobile node, wherein the home agent discovery message comprises information on the mobile node's location prior to changing the mobility management scheme; maintaining bindings of plural mobile nodes served by the home agent in a binding cache; determining whether a binding cache entry exists for the mobile node from which the home agent discovery message has been received; determining, based on the location information comprised in the home agent discovery message, information helping the mobile node to discover the home agent serving the mobile node, if no binding cache entry exists for the mobile node; and transmitting a response message comprising the information helping the mobile node to discover the home agent serving the mobile node to the mobile node from which the home agent discovery message has been received.

BRIEF DESCRIPTION OF THE SEVERAL VIEWS OF THE DRAWINGS

In the following, the invention is described in more detail in reference to the attached figures and drawings. Similar or corresponding details in the figures are marked with the same reference numerals.

DETAILED DESCRIPTION

In the following the principles of the invention will be explained with respect to different embodiments. For exemplary purposes most of the following examples relate to a change from a network-based mobility scheme to a client-based mobility scheme, or to a mobile node moving out of coverage of a Proxy Mobile IP domain and entering a network region where (Client) Mobile IP is used.

When a mobile node is attaching to a network that uses network-based mobility management, the network selects an anchor (home agent/local mobility anchor) for the mobile node and registers the mobile node at this home agent/local mobility anchor using the standard signaling mechanisms. In case the mobile node moves from this network area using network-based mobility management to a network area, where host-based mobility management is used, the IP address prefix in this new network area is typically different to the one offered to the mobile node in the network area using network-based mobility management (for PMIP the home address prefix of the mobile node). Accordingly, the mobile node configures a new IP address according to the advertised prefix in the new access area and needs to register the newly configured address as its care-of address with its anchor (home agent).

To provide session continuity, the mobile node needs to register with the same anchor (home agent) where it has registered when using the network-based mobility management. In other words, in case the mobile node is leaving the PMIP domain and enters another domain (having an IP address prefix different from the one offered in the PMIP domain) the mobile node needs to register a topologically correct IP address at the home agent in the PMIP domain where it has been registered by its PMIP proxy in the PMIP domain. The mobile node should therefore be enabled to discover the address of the very home agent where the network has registered the mobile node before, as the registration of the mobile node in the PMIP domain has been transparent to the mobile node so that it is not aware of its serving home agent.

Especially, if the mobile node is moving in a huge packet-switched network with many home agents (e.g., the network of a large operator in China, India or the United States) and the mobile node has traveled large distances during the session since the initial attach, it is likely that the mobile node discovers a wrong home agent in a different network region at the time of initiating (Client) Mobile IP bootstrapping, because the home agent discovery or assignment mechanism is typically designed to assign a home agent close to the current location of the mobile node. For instance, an anycast home agent discovery message is typically delivered to the closest of all anycast group members, which is however not necessarily the home agent that has been serving the mobile node prior to bootstrapping in the new network region after movement.

Figure 1:
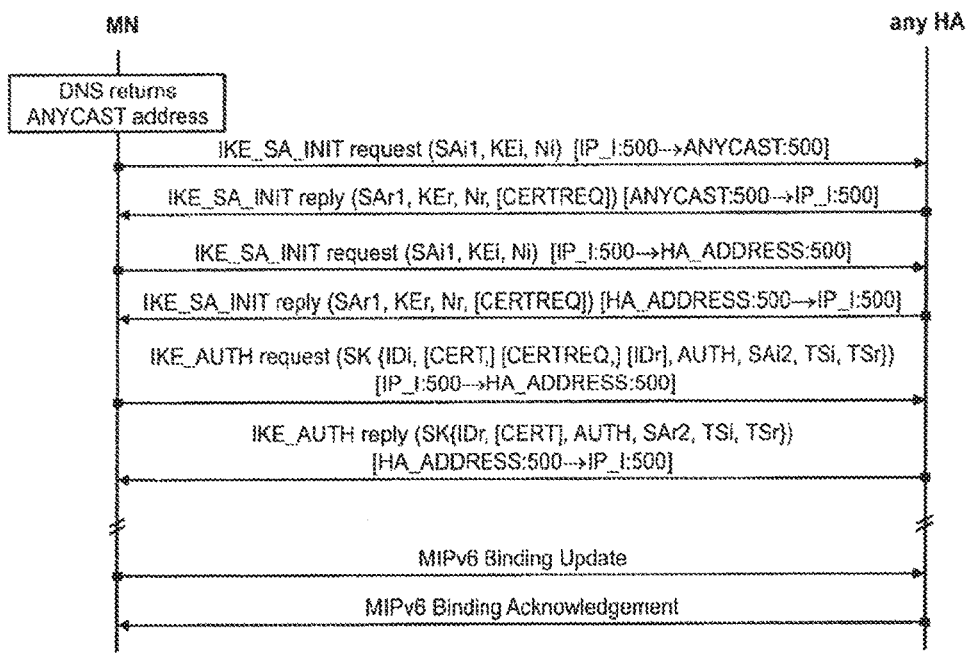
FIG. 1 shows an IKEv2 signaling procedure according to Dupont et al., "IKEv2-based Home Agent Assignment in Mobile IPv6/NEMO Bootstrapping"
Figure 2:
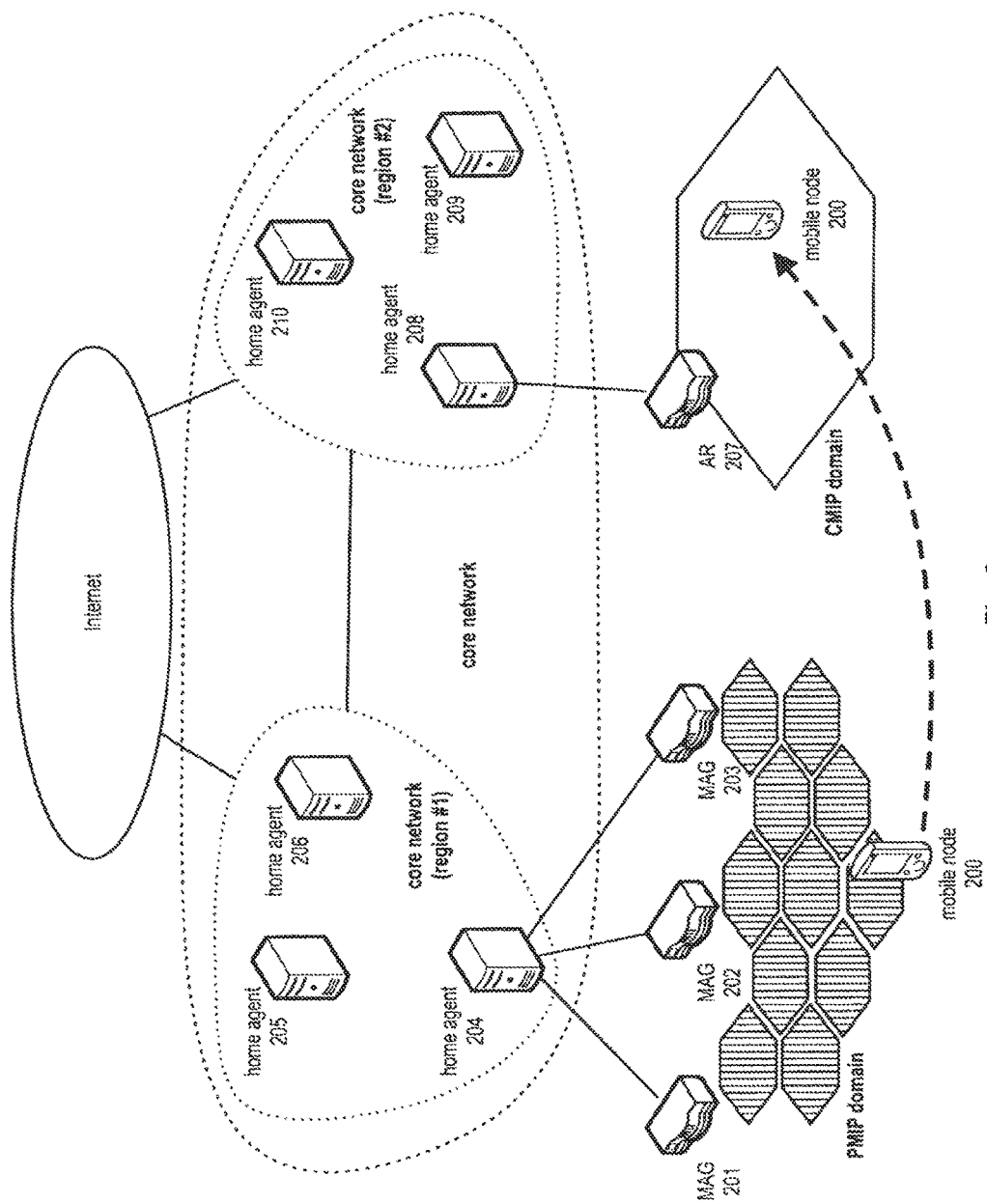
FIG. 2 illustrates an exemplary packet switched-network offering different mobility management schemes in different network areas based on which the aspects of the invention will be exemplarily described in further detail

FIG. 2 illustrates an exemplary packet switched-network offering different mobility management schemes in different network areas based on which the aspects of the invention will be exemplarily described in further detail. For example, there may be a 3GPP-based network offering access through its radio access network and a network-based mobility management in one area of the network (see left-hand side in FIG. 2), while there is a second network area where—for example—Wireless LAN access is provided and a client-based mobility scheme is used (see right-hand side in FIG. 2). The first and the second network area typically announce different address prefixes on the wireless link.

The core network of an operator or part of it may be considered the CMIP home network of the mobile nodes. The core network connected to the respective access networks may be logically divided into different regions, where the core network of region #1 comprises three home agents 204, 205, 206 at which the mobile access gateways MAG 201, 202, 203 register the mobile nodes within the PMIP domain offered in the 3GPP-network area. Furthermore, the address prefix of the home agent addresses in the different core network regions may be the same or different. The home agents of a specific region may be assigned to different groups, each having a common group identifier (e.g., DNS name, anycast address or multicast address).

The core network of region #2 also comprises three home agents 208, 209, 210, that are connected to the access network by an access router AR 207. The nodes in the different core network regions are interconnected and may be also be connected individually to the Internet to route traffic to some destination (e.g., corresponding nodes) attached to the Internet. For exemplary purposes the network area providing 3GPP-based access and using a network-based mobility scheme and to which core network region #1 is assigned is geographically located in Shanghai, China, while the network area providing a WLAN access and a client-based mobility management scheme and to which core network region #2 is assigned is geographically located in Beijing, China.

Mobile node 200 may be assumed to initially attach to the 3GPP-based network area, of Shanghai, China which uses network-based mobility management and which assigns home agent 204 to mobile node 200. Then the user of mobile node 200 travels a large distance to Beijing, China where he moves to a network area which uses host-based mobility management. When initiating (Client) Mobile IPv6 bootstrapping in Beijing, China, mobile node 200 will discover one of the three home agents in the core network region #2 (for example home agent 208), which is not home agent 204 where mobile node is registered and hence is the "wrong" home agent, which cannot provide session continuity.

One approach considered by the invention to overcome this undesirable situation is that mobile node 200 first starts discovering any home agent in the network area it moved to and when it tries to register its new address with the discovered home agent (in the example home agent 208), home agent 208 relocates mobile node 200 to the correct home agent (in this example home agent 204). This approach however requires synchronization of the binding caches of all home agents in the network, so that every home agent knows the correct home agent of any mobile node and is able to relocate a mobile node to the correct home agent during the binding update procedure. Obviously, in large networks where many home agents and mobile nodes are served this can be cumbersome and inefficient, but could be solved by loading off the relocation decision to another entity, like an AAA server.

Even if such solution is implemented, another critical issue is the handover delay. The handover delay in this proposed solution may be assumed to be very high in case the home agent discovery cannot be done proactively before the handover (which is not always possible), since the mobile node first needs to bootstrap the security associations, then register with the wrong home agent, then tear down the security associations and registrations again, and finally start bootstrapping with the correct home agent. This can lead to unwanted or even unacceptable interruptions of the service (from a user's point of view). Offloading the relocation decision to a central entity like AAA may increase the handover delay further, since this typically requires additional signaling between the home agent and the central entity (AAA server).

Another, potentially more favorable approach according to the main aspect of the invention is that the mobile node reveals information about its previous movement or location to the network when needing to discover its home agent to which it is registered. If a home agent discovery message containing such information from the mobile node is received by a home agent or home agent discovery server, the home agent or home agent discovery server can return hints to the mobile node that help the mobile node discovering the home agent where the mobile node is registered. The mobile node may for example try discovering its serving home agent upon change of the mobility management scheme, for example caused by movement of the mobile node, the mobile node moving to an un-trusted access network, etc.

The information included by the home agent or home agent discovery server to its response may for example include a hint allowing the mobile node to derive a valid address (e.g., an anycast group address, multicast group address or a unicast address). In general, the hint or hints provided to the mobile node may be for example an address prefix, an address suffix or a (part of) a DNS domain name of the domain where the home agent or home agent discovery server assumes the home agent at which the mobile node is registered to be located. Another possibility is to include an address or addresses to the response message, if available.

In order to aid the home agent or home agent discovery server determining a hint or redirection information to be provided to the mobile node, the mobile node may for example include information to the home agent discovery message that is indicative of the mobile node's location or movement prior to changing the mobility management scheme or to attaching to an un-trusted access network such as the mobile node's location at initial attach, which may help the network to identify the mobile node's serving home agent without requiring synchronization of the binding caches of all home agent in the network.

Such information, also referred to as location information herein, may for example be an identifier (e.g., IP address, Layer 2 address (e.g., MAC address), etc.) of the base station, mobile access gateway or access router to which the mobile node was attached, geographic location of the mobile node (e.g., obtained from GPS receiver), cell ID, SSID, Routing/Tracking Area, Public Land Mobile Network identifier, or even advertised service information, type of access network or access technology. The mobile node may include information about its location at initial attach and/or about locations it has visited while traveling in the packet-switched network, determined by the mobile node on a regular or event-triggered basis, etc. In some cases it may be sufficient to include only one singe previous location (e.g., the location at initial attach) to the home agent discovery message to allow the home agent or home agent discovery server to obtain a hint on the correct location or address of the home agent serving the mobile node.

In addition to the location information or alternatively the mobile node may also indicate an identifier of the mobile node in the home agent discovery message. For example, such identifier may be the mobile node's NAI, its current address or prefix.

Hence, the home agent or home agent discovery server is capable of deriving the hints based on the mobile node's identifier and/or the location information in the home agent discovery message that it communicates to the requesting mobile node in the home agent discovery response message. In addition the home agent or home agent discovery server may maintain further information, mapping information, that allow mapping the location information and/or (a part of) the mobile node's identifier to hints helping the mobile node to discover the correct home agent. For example, the home agent could maintain a list of mobile access gateway identifiers which allows identifying a certain region in the packet-switched network, for example domain or address prefix, that is provided as a hint to the mobile node. Another option may be that based on the identified network region, the home agent can determine a routable address (anycast, multicast, or unicast) that the home agent or home agent discovery server provides to the mobile node.

In some cases the hints in the response message received from the entity to which the first home agent discovery message has been sent may already be sufficient to uniquely identify the serving home agent (note that even in case a unicast address is provided in the response message to the first home agent address discovery message, this address should be but is not necessarily the address of the home agent where the mobile node is registered). Optionally, the home agent discovery message may have a flag indicating the certainty of the hint in the home agent discovery. For example, in case a home agent is capable of identifying the (unicast) home agent address of the home agent where the mobile node is registered, it includes the (unicast) home agent address in the response message and may further set the flag therein in order to indicate to the mobile node that the home agent is certain that the indicated address is correct. This may allow reducing the signalling overhead, as the mobile node may not need to check whether the indicated home agent is indeed the home agent where the mobile node is registered and the mobile node does not need to include location information in the next messages sent to the home agent.

If the information in the home agent discovery response is not correct, a home agent receiving a further home agent discovery message sent by the mobile node may also return a response message including a new hint to mobile node that helps the mobile node discovering the correct anchor, and the mobile node may use the new hint in sending a further home agent discovery message. In general, the hint in the response message may for example be determined by the home agent or home agent discovery server based on the information about previous location(s) of the mobile node as included by the mobile node in the home agent discovery message.

Generally, it should be noted that the term "home agent discovery message" and "home agent discovery server" has been used herein, as there are different possibilities in which signalling procedure to include the location information of the mobile node. Accordingly, the term home agent discovery message is to be understood as a signalling message that includes at least one of a location information of the mobile node and a mobile node identifier and that triggers the receiving node to respond ("home agent discovery response") by sending a hint enabling the mobile node to discover its serving home agent, if the entity receiving the home agent discovery message is not the home agent where the mobile node is registered. In this respect the home agent discovery server is denoting a server or network node in the core network of a mobile communication system or a packet-switched network that is receiving and responding to the home agent discovery message.

The home agent discovery message and response may be for example newly defined signalling messages that are added to an existing signalling procedure or may be extended signalling messages of an existing signalling procedure. For example, in some embodiments, the home agent discovery messages and the response messages thereto are messages of an authentication procedure for authenticating the mobile node or for exchanging shared keys and establishing a security association between the mobile node and the node receiving the home agent discovery message. This authentication procedure may be for example an IKEv2 signaling procedure to establish an IPsec security association (see IETF RFC 4306, IETF RFC 3776, and IETF RFC 4877 mentioned previously herein) and the home agent discovery messages and the response thereto are modified messages of this signaling procedure.

In some other embodiments of the invention, the home agent discovery message sent to the home agent discovery server is a binding update including an authentication option (as provided in IETF RFC 4285) that is extended with location information. Accordingly, the home agent discovery server in this exemplary embodiment is a home agent and its response message is a binding acknowledgement additionally including a hint helping the mobile node discovering the correct home agent.

In again other embodiments of the invention, the home agent discovery message sent to the home agent discovery server is a DHCP information request message that is including additional location information and optionally the mobile node's identifier. Accordingly, the home agent discovery server in this exemplary embodiment is a DHCP server that is responding to the DHCP request message by a DHCP information reply comprising a hint helping the mobile node discovering the correct home agent.

Figure 3:
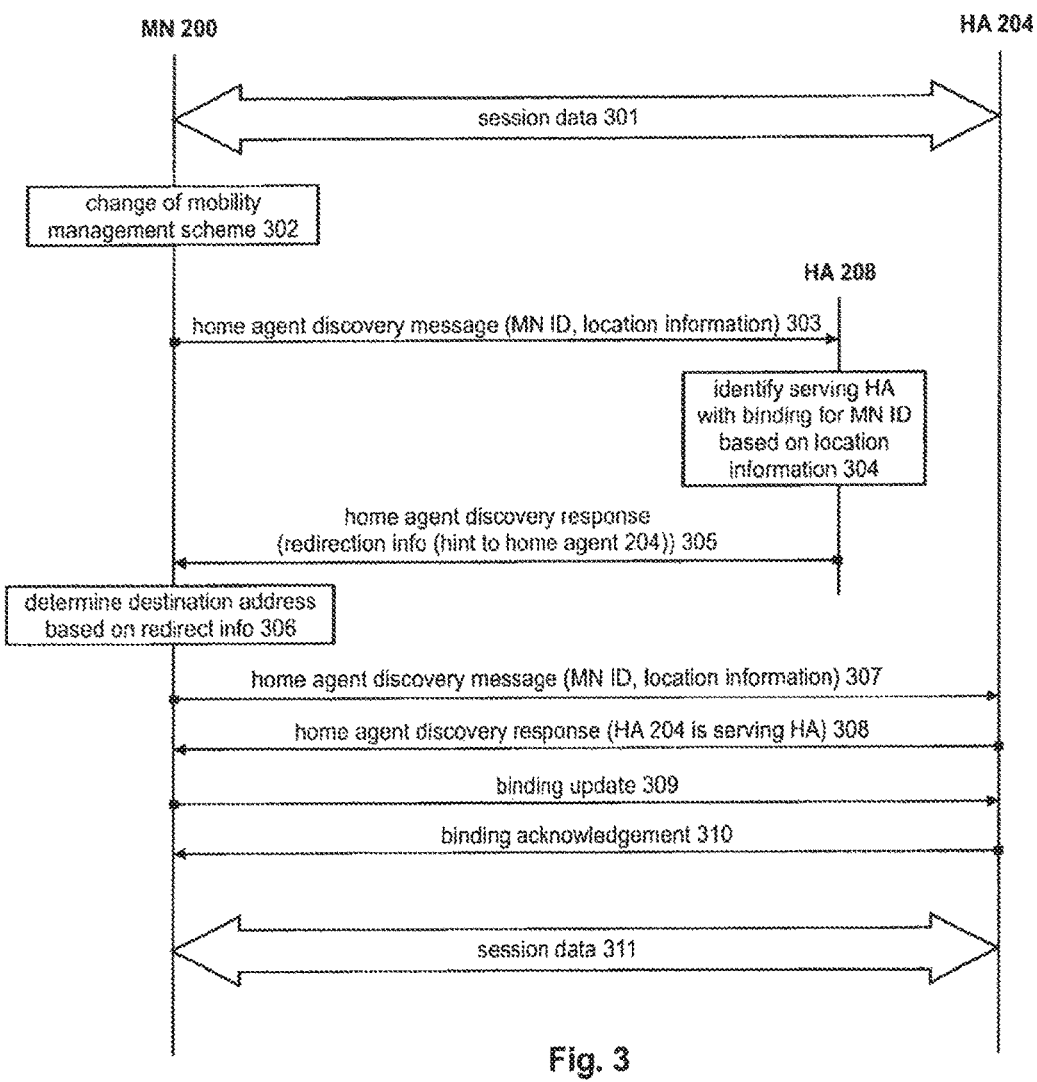
FIG. 3 shows an exemplary signaling flow for discovering the home agent serving a mobile node and for registering the mobile node at the discovered serving home agent according to one exemplary embodiment of the invention

FIG. 3 shows an exemplary signaling flow for discovering the home agent serving mobile node 200 and for registering mobile node 200 at the discovered serving home agent 204 according to one exemplary embodiment of the invention. It may be assumed that mobile node 200 has an ongoing session while moving through the network and utilizes a network-based mobility management protocol, here Proxy MIPv6 for exemplary purposes, to transfer 301 session data when being located in the PMIP domain.

For example, upon handover/loosing coverage to the access network of the PMIP domain, leaving the PMIP domain, or traveling into network area where better Quality of Service can be provided by another access technology, mobile node 200 changes 302 the mobility management scheme, here exemplary purposes a Client MIPv6 . Changing to Client MIPv6 requires the configuration of a new topologically correct care-of address for communication at mobile node 200 within the Client MIPv6 network area (for example sub-net or (sub-)domain). In order to ensure session continuity, mobile node 200 needs to register its newly configured care-of address at the home agent having served mobile node 200 prior to changing the mobility management scheme. As Proxy MIPv6 has been used upon initial attach prior to the change of the mobility management scheme to Client MIPv6, mobile node 200 may be assumed unaware of its serving home agent.

Mobile node 200 sends 303 a home agent discovery message to the new network area (in this example Client MIPv6 access network area and core network region #2). This message may be for example sent using an anycast address of all home agents in the network as a destination address.

The home agent discovery message includes local information that helps the receiver of the message to identify 304 the correct home agent serving the mobile node or may at least allow providing mobile node 200 with a hint on the location or network area, where the serving home agent should be found (e.g., hint towards core network region #1).

Local information included to the home agent discover message can be for example the information about the initial point of attachment of mobile node 200 in the network area prior to changing the mobility scheme (in this example the Proxy MIPv6 domain), because this is where the network assigned a home agent for mobile node 200 and the home agent assignment algorithm typically considers the current location of the mobile node.

The point of attachment could, for example, be identified as a geographic location (e.g., if mobile node 200 has a GPS receiver), the IP address of MAG/default router, cell ID, SSID, Routing/Tracking Area (if mobile node 200 was in a 3GPP access before), Public Land Mobile Network identifier, advertised service information, type of access network or access technology, as mentioned previously. If the PMIP home addresses and prefixes that the network assigns to the mobile node are bound to specific home agents, the prefix of the mobile node's address is another local information that mobile node 200 may include in the home agent discovery message and that may help the network to identify the mobile node's home agent (e.g., PDN-GW in a 3GPP SAE network) at time of initial attach. If Proxy Mobile IP was based on a tunnel interface of mobile node 200 to its PMIP proxy (e.g., an ePDG in a 3GPP SAE network has been serving mobile node 200 as a PMIP proxy), the mobile node could also signal information about the tunnel endpoint such as tunnel endpoint IP address (e.g., the ePDG's IP address or the remote address assigned by the ePDG to the mobile node) as location information.

Generally, the home agent discovery message optionally includes one or more of the following parameters: a mobile node identifier to allow the network to identify the mobile node (e.g., NAI or pseudo-NAI), a session identifier to identify the session (PMIP home address) and a flag that a home agent/local mobility anchor for continuing an existing session is requested. It should be noted that in practical implementations of Mobile IP, MIP is often used in connection with AAA. Accordingly, the binding cache entries in the home agents are typically not only identified by the respective home address of the mobile nodes, but additionally a NAI is used to organize and search the bindings.

In the example of moving from a Proxy MIPv6 domain to a Client MIPv6 network area, mobile node 200 may signal a NAI or pseudo-NAI identifying the mobile node (as this identifier may be assumed to be used by the home agents to maintain and identify care-of address registrations in the binding cache). Accordingly, if the home agent does not maintain a binding cache entry for the indicated mobile node identifier, it may assume that it is not (has not been) serving mobile node 200 and tries to identify 304 the home agent serving mobile node 200 or a hint to the serving home agent.

In the example shown in FIG. 3, the home agent discovery message is routed to home agent 208 in the core network region #2 (see FIG. 2). It is further assumed for exemplary purposes that home agent 208 may identify the correct home agent's address (i.e., the address of home agent 204) that has been serving mobile node 200 prior to changing the mobility management scheme. Accordingly, home agent 208 includes a redirection information option in the response message that is sent 305 to mobile node 200 in response to the home agent discovery message. This redirection information includes the (unicast) address of home agent 204.

The home agent discovery response from home agent 208 informs mobile node 200 on home agent 208 not being its serving home agent. Mobile node 200 detects the redirection information option in the response message and identifies 306 the information therein as a unicast address. Accordingly, mobile node 200 generates another home agent discovery message and transmits 307 the home agent discovery message to home agent 204 using the address indicated in the home agent discovery response message received 305 from home agent 208 as the destination of the new home agent discovery message.

The content of this new home agent discovery message may be similar to the one sent 303 to home agent 208. As home agent 204 receiving 307 the home agent discovery message is the serving home agent, it responds 308 with another home agent discovery message that indicates it is the home agent where mobile node 200 is registered. Upon receiving the response, mobile node 200 sends 309 a binding update to home agent 204 to register the new (care-of) address at home agent 204 which is updating the mobile node's binding and acknowledges 310 the updated binding. Upon updating the mobile node's binding, home agent 204 and mobile node 200 can continue the session and may exchange 311 session data.

In a further embodiment of the invention, the procedure in FIG. 3 may be further optimized. For example, in case all information necessary for sending a binding update are available to mobile node 200—e.g., all security related parameters to be included in the binding update are available to mobile node 200 and/or mobile node 200 is sure that the indicated address in the response from home agent 208 is correct (e.g., by a respective flag being set in the response), steps 306 and 307 may be skipped and mobile node 200 may send 308 a binding update to home agent 204 upon receiving the home agent discovery response with the redirection information from home agent 208. In this exemplary embodiment, mobile node 200 may trust the redirection information in the home agent discovery response being correct, so that in case the redirection information indicate a unicast address or uniquely identifies the correct home agent in any other manner, mobile node 200 may assume the redirection information to identify the correct serving home agent 204 (or this may be indicated on the response by a flag), so that no home agent discovery message needs to be sent to home agent 204. Similarly, even in case the redirection information does not indicate a particular address, but only contains a hint helping to identify the correct home agent (e.g., the prefix of core network region #1 in the example discussed with respect to FIG. 3), and further assuming that mobile node 200 may uniquely identify the serving home agent using the redirection information (e.g., there is only one home agent with this prefix), mobile node 200 may send a binding update without transmitting a further home agent discovery message.

In general, it should be noted that in some embodiments the home agent discovery message and response may be realized by extending existing signaling messages in the procedures taken upon the mobile node changing its mobility management scheme or configuring a new address which needs to be registered at its serving home agent to assure session continuity. In order to minimize the delay of the registration, the location information of the mobile node and the response including a hint to the home agent serving the mobile node may be provided in the first signaling messages of the respective procedures taken upon the mobile node changing its mobility management scheme or configuring a new address which needs to be registered at its serving home agent to assure session continuity. This aspect will be exemplarily outlined in the following with respect to FIG. 4.

Figure 4:
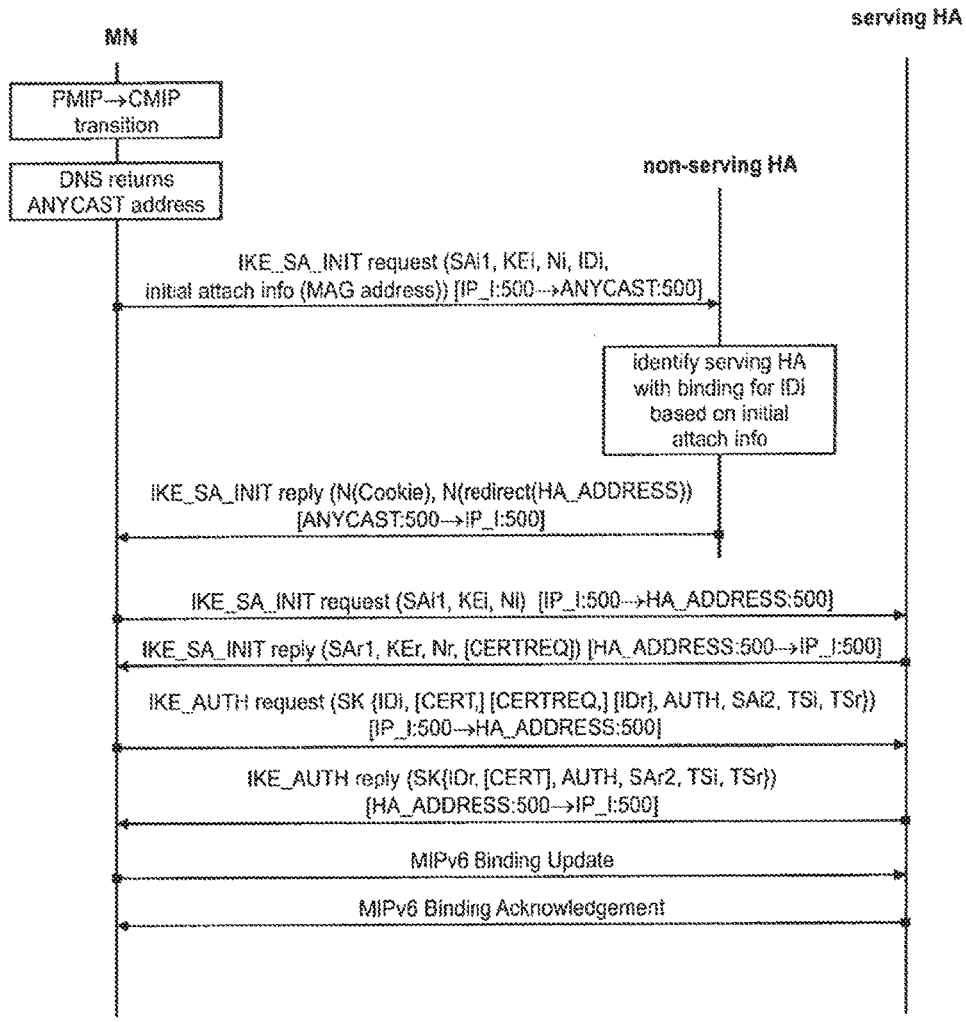
FIG. 4 shows a modified IKEv2 signaling procedure that allows discovering the home agent serving the mobile node, establishing an IPsec security association with the serving home agent and subsequently sending a binding update to the serving home agent according to an exemplary embodiment of the invention.

FIG. 4 shows a modified IKEv2 signaling procedure that allows discovering the home agent serving the mobile node, establishing an IPsec security association with the serving home agent and subsequently sending a binding update to the serving home agent according to an exemplary embodiment of the invention. The signaling procedure essentially corresponds to the signaling procedure defined in IETF RFC 4306, and considering the further configurations suggested in IETF RFC 3776 and IETF RFC 4877 mentioned previously herein, whereby the following description focuses on the changes applied to this procedure according to this exemplary embodiment.

For exemplary purposes a situation substantially similar to the one outlined with respect to FIG. 3 may be assumed. Mobile node 200 may be assumed to change its mobility management scheme from using Proxy MIPv6 in a PMIP domain of the network to a Client MIPv6 service area of the network (PMIP→CMIP transition). Mobile node 200 configures a new IP address (care-of address) based on a prefix advertised in the new network area where Client MIPv6 is used and may for example query a DNS server to obtain an IP address for a predetermined URL of the home agents in the network (e.g., there may be a DNS entry for "home-agents.example.com" in the DNS record). The DNS server returns an anycast address (ANYCAST) of an anycast group to which the home agents in the network belong. Alternatively, the anycast address may be known to mobile node 200 or may be configured based on the prefix advertised in the Client MIPv6 network area (e.g., in a DHCP option for local home agent addresses or prefixes) so that no DNS request is needed in this case.

As indicated above, it is desirable to redirect mobile node 200 as early as possible in the IKEv2 signaling procedure in case a non-serving home agent receives a home agent discovery message. The earliest point in time to include the location information would be the first message of the security association setup, which is the IKE_SA_INIT request message when using the IKEv2 signaling procedure. Hence, in this exemplary embodiment the IKE_SA_INIT request of the IKEv2 signaling procedure is extended to comprise location information of the mobile node is thus representing an exemplary implementation of a home agent discovery message.

The location information may be for example comprised in a newly defined option in this signaling message. In FIG. 4, this is exemplarily illustrated in form of the option "initial attach info" that includes the location information (e.g., the MAG IP address of the MAG serving mobile node 200 in the PMIP domain). The IKE_SA_INIT request of the IKEv2 signaling procedure may be further extended to comprise an option for signaling a mobile node's identifier. This is indicated in FIG. 4 by the IKE_SA_INIT request comprising the parameter IDi which may be for example the mobile node's NAI or pseudo-NAI.

The IKE_SA_INIT request is transmitted using the anycast address (ANYCAST) as the destination address and newly configured mobile node's (care-of) address as the source address. This is exemplarily indicated in FIG. 4 by [CoA:500→ANYCAST:500] which means that the IKE_SA_INIT request is sent from source address corresponding to the newly configured care-of address CoA on port 500 to destination address ANYCAST to port 500. A similar notation is used for the remaining signaling messages shown in FIG. 4.

The IKE_SA_INIT request is received at home agent 208, which processes the message and recognizes that it is not serving mobile node 200 due to failing to identify a binding cache entry for the mobile node's NAI in the IKE_SA_INIT request. Accordingly, home agent 208 tries to identify the home agent serving mobile node 200 using the location information and further optional additional knowledge on the network topology, domain prefixes, etc., and identifies a home agent address HA_ADDRESS of the potential home agent where the mobile node has been initially registered when attaching to the PMIP domain of the network.

Home agent 208 responds to the IKE_SA_INIT request with an extended IKE_SA_INIT reply. This IKE_SA_INIT reply comprises a redirection option that includes the hint to the correct home agent (or its address) identified by the home agent when processing IKE_SA_INIT request and detecting that it is not the serving home agent of the mobile node. Accordingly, home agent 208 includes the determined home agent address HA_ADDRESS to the IKE_SA_INIT reply and sends the reply message to mobile node 200.

Mobile node 200 receiving the IKE_SA_INIT reply recognized that home agent 208 sending the reply is not the home agent where mobile node 200 is registered based on the included redirection information. Accordingly, mobile node 200 may interrupt the IKEv2 signaling procedure, and start a new IKEv2 signaling procedure now directing the IKE_SA_INIT request to a destination indicated by in the IKE_SA_INIT reply from home agent 208 (in this example the address HA_ADDRESS) or and address that the mobile node may derive from the redirection information (hint) in the IKE_SA_INIT reply from home agent 208 (this operation may also be referred as the mobile node restarting the IKEv2 signaling procedure).

The new home agent receiving the IKE_SA_INIT request notices (based on the NAI) that it is serving the mobile node and replies with a normal IKE_SA_INIT reply without redirect information. The mobile node then continues with the normal IKEv2 signaling and sends an IKE_AUTH message to authenticate itself and setup an IPSec security association.

Upon having received the IKE_AUTH reply message from home agent 204, mobile node 200 has established an IPsec security association with home agent 204 and is thus in the possession of all relevant security parameters to generate and send a MIPv6 Binding Update for registering the new care-of address CoA with its serving home agent 204. Upon home agent 204 having updated the binding, it sends a MIPv6 Binding Acknowledgement to mobile node 200.

In the exemplary embodiments described referring to FIG. 3 and FIG. 4 above, it has been assumed that the home agent receiving a home agent discover message is capable of identifying (based on inter alia the location information) and informing the mobile node on the home agent where it is registered. However, this may not always be the case. For example, if the mobile node sends the home agent discovery message to the anycast group where the correct home agent is member of, it is possible that a wrong home agent in this group receives and rejects the message. In this case the mobile node may either just again try sending a home agent discovery message with the same anycast group until hoping that the message will be routed to the correct home agent this time or the wrong home agent is able to give a more precise hint (e.g., unicast address of correct home agent or another anycast address pointing to a different anycast group). Reporting the unicast address is, e.g., possible if all home agents within one anycast group know the binding caches of all other home agents that are member of the same anycast group.

Figure 5:
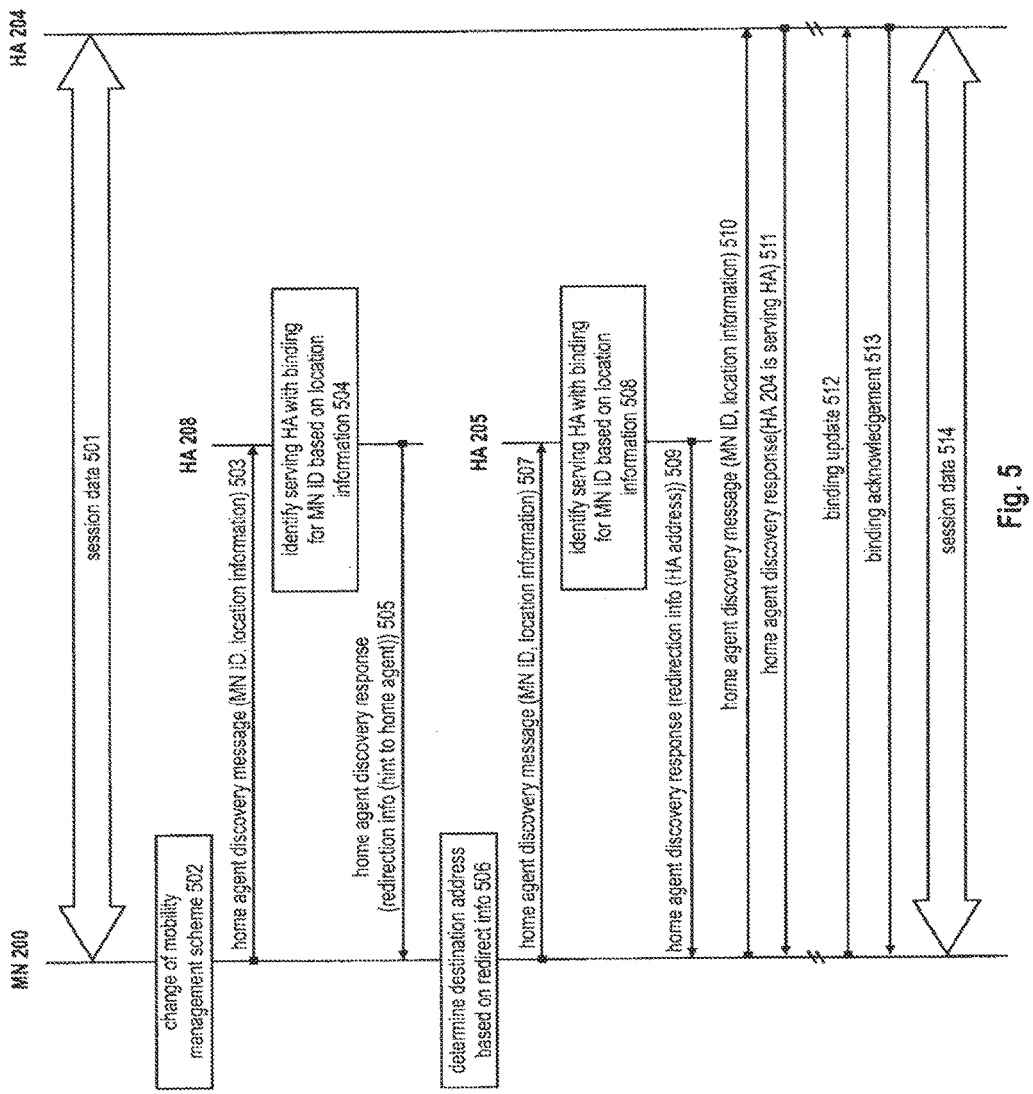
FIG. 5 shows an exemplary signaling flow for discovering the home agent serving a mobile node and for registering the mobile node at the discovered serving home agent according to one exemplary embodiment of the invention, wherein the home agent receiving the first home agent discovery message may not identify the home agent serving the mobile node.

This scenario is exemplarily outlined in the following in further detail with respect to FIG. 5. FIG. 5 shows an exemplary signaling flow for discovering the home agent serving mobile node 200 and for registering mobile node 200 at the discovered serving home agent 204 according to one exemplary embodiment of the invention, wherein the home agent receiving the first home agent discovery message may not identify the home agent serving the mobile node.

Substantially, steps 501, 502 and 503 correspond to steps 301, 302 and 303 in FIG. 3. Accordingly, it is referred to the description of FIG. 3 above with respect to these three steps.

Home agent 208 processes the home agent discovery message essentially similar as for step 304 in FIG. 3. However, this time the location information in the home agent discovery message (and the additional information available) is not sufficient to uniquely identify the home agent serving mobile node 200 at home agent 208. However, the information available to home agent 208, may be for example sufficient to indicate a IP address prefix or anycast or multicast address or DNS name of region #1 to mobile node 200. Accordingly, home agent 208 may indicate in the home agent discovery response transmitted 505 to mobile node 200 that it is not the home agent where mobile node 200 is registered and home agent 208 may further include the IP anycast or multicast address or address prefix or DNS name of the core network region #1 in the response message.

The response informs mobile node 200 that home agent 208 is not the home agent where it has been registered in the PMIP domain. Mobile node 200 further uses the redirection information indicating the core network region #1's anycast address or address prefix or DNS name to determine 506 an anycast address based on the address prefix. For example, the home agents in a core network region may all belong to an anycast group the anycast address of which may be determined from an address prefix advertised in the network region according to a predetermined rule, so that mobile node 200 can derive the correct anycast address from the address prefix provided in the home agent discovery response message. Alternatively, the redirection information may contain a DNS name that mobile node 200 resolves using a DNS service.

Upon having determined the anycast address of the home agents in the PMIP domain, mobile node 200 sends 507 home agent discovery message to this determined anycast address, which is similar to the home agent discovery message in step 503 except for being destined to the determined anycast address.

In this example the anycast address determined by mobile node 200 is the group address of home agents 204, 205, 206 in the core network region #1 as shown in FIG. 2. It may be assumed that the home agent discovery message is routed to home agent 205 of the anycast group, which is however not the home agent where mobile node 200 is registered. In this example, it may be assumed that the home agents of an anycast group are aware of the bindings maintained by the other group members, so that home agent 205 is able to identify 508 the correct home agent of the anycast group where mobile node 200 is registered using the mobile node and/or session identifier indicated in the home agent discovery message. Accordingly, home agent 205 responds 509 to the home agent discovery message by sending a home agent discovery response in which home agent 205 indicates that it is not the home agent serving mobile node 200 and in which home agent 204 includes the IP address of home agent 204 (HA_ADDRESS) in the redirection option of the home agent discovery response message.

Having received the response message, mobile node 200 may now send 510 a further home agent discovery message to the correct home agent 204, and receives 511 a positive response from home agent upon which mobile node 200 registers 512, 513 its new care-of address at home agent 204 and continues 514 with the session. In some scenarios, steps 510 to 514 correspond to steps 306 to 310 in FIG. 3. Steps 510 and 511 may be optional as described for steps 308 and 309 above. As mentioned earlier, multicast or unicast addresses could be used instead of anycast addresses as well.

Generally, it should be noted that the mobile node may continue sending new home agent discovery messages to a destination indicated in or derived from the previous home agent discovery response message until it has found the home agent where it has been registered. However, it appears desirable that there is a terminating condition so that the mobile node is not caught in a loop never discovering its serving home agent. Accordingly, in further embodiments of the invention different terminating condition may be defined.

For example, if the hint of a home agent included in the home agent discovery response has been wrong and the mobile node sends home agent discovery messages to the wrong anycast group, there must be some mechanism that prevents the mobile node to search forever in this wrong anycast group. One option is that the mobile node just limits the number of tries (e.g., 5 times) and if it does not find the correct home agent within these tries, it switches back to the anycast group with next higher scope (e.g., a global anycast address of an anycast group comprising not only the home agents of a sub-region in the core network but all home agents of a larger core network region or possibly the entire core network). Another option is to trigger the switchback when the mobile node notices that the same wrong home agent replies to the home agent discovery request for a certain number of times.

A further option to prevent hitting the same wrong home agent multiple times is that a wrong home agent receiving the discovery message de-configures the anycast address and hence leaves the anycast group. However, this typically requires per-mobile node unique home agent anycast addresses, so that the home agent discovery processes of other mobile nodes are not affected.

Furthermore, another terminating condition may be needed, if the home agent discovery responses may not render the hints to the correct home agent more precisely. For instance, though different but non-serving home agents keep responding to the home agent discovery messages, their hints may be repetitive or erroneous so that the transmission of a further home agent discovery message by the mobile node may not result in a progress in discovering the home agent serving the mobile node. Accordingly, if the mobile node repeatedly receives for example the same hint (e.g., a same but wrong unicast IP address), the mobile node may interrupt the discovery procedure.

The different options mentioned above may also be used together to avoid an overly time consuming home agent discovery or the mobile node being caught in a loop.

Of course, the IKEv2 signaling procedure for establishing an IPsec security association is not the only signaling procedure in which the principles and ideas of the invention may be implemented. Another option, according to a further embodiment of the invention, is to use the principles and ideas in a Dynamic Home Agent Address Discovery (DHAAD) as known from IETF RFC 3775. In this exemplary embodiment the DHAAD request message may be for example extended by including location information and optionally a mobile node identifier.

Figure 6:
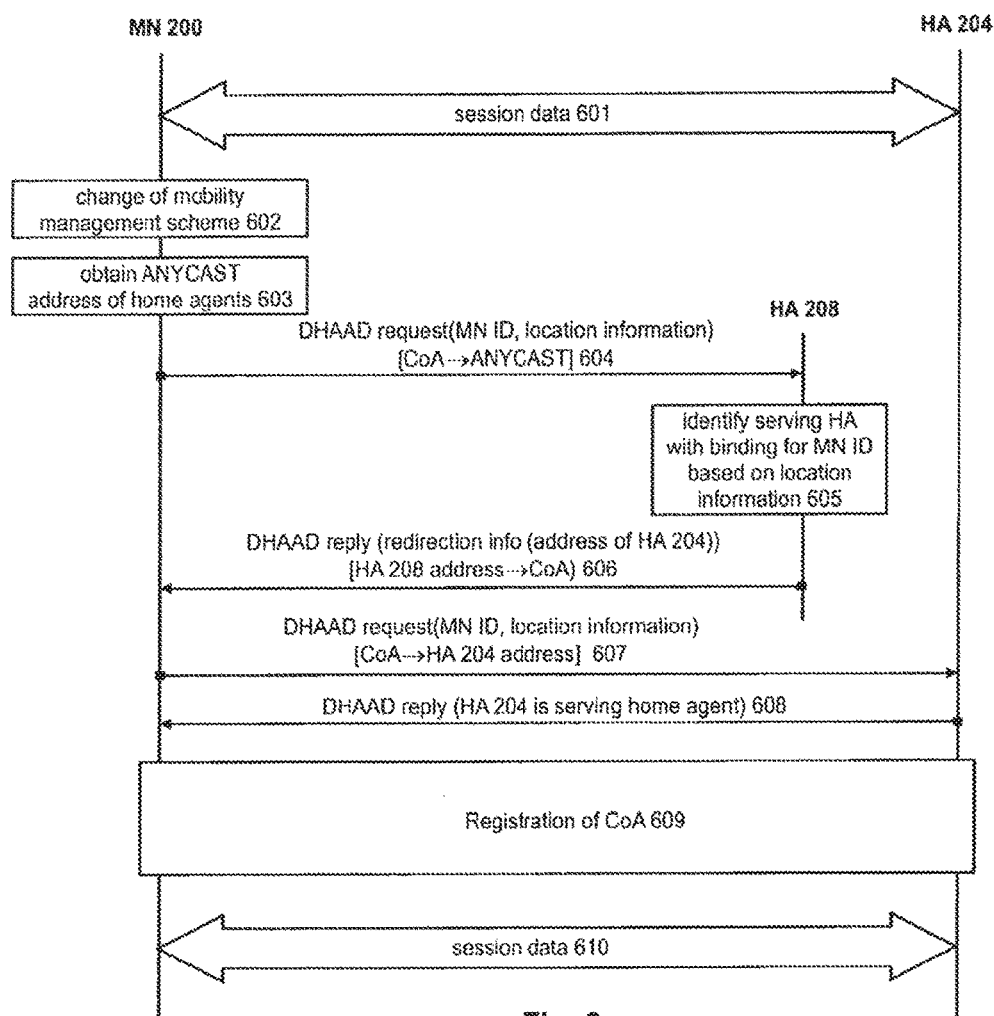
FIG. 6 shows an exemplary signaling flow of a modified dynamic home agent discovery procedure according to an exemplary embodiment of the invention.

FIG. 6 shows an exemplary signaling flow of a modified dynamic home agent discovery procedure according to an exemplary embodiment of the invention. Similar to steps 301, 302 and steps 501, 502 in FIG. 3 and FIG. 5, mobile node 200 may have an ongoing session and exchanges 601 session data with its home agent 204 and may change 602 the mobility management scheme. Next, mobile node 200 may configure a new care-of address (not shown) and obtain 603 the anycast address (ANYCAST) that may have been assign to the home agents in the core network. This may be for example accomplished by querying a DNS server (for example querying a preconfigured DNS name like "home-agents.example.com") for an IP address of the home agents in the network. Alternatively, this anycast address may be known to mobile node 200 or may be derived from a network prefix advertised in an access network to which mobile node 200 is connected.

Upon having obtained 603 the anycast address, mobile node 200 sends 604 a DHAAD request destined to the anycast address. The DHAAD request is extended by comprising location information of mobile node 200 as explained previously herein and may further optionally include an identifier of the mobile node 200 such as for example a NAI or pseudo-NAI.

Considering the exemplary scenario of FIG. 2, mobile node may have moved to a network area where access router AR 207 is serving the access network and where Client MIPv6 is used for mobility management. Accordingly, the routing protocol may route the DHAAD request to the nearest home agent, which is assumed to be home agent 208 in this example. Home agent 208 determines that it is not serving the querying mobile node (e.g., by being unable to find a binding cache entry for mobile node 200) and thus tries to determine 605 at least a hint to the home agent that is serving mobile node 200 based on the location information of in the DHAAD request and optionally further information available to home agent 208. Assuming that the home agents in the anycast group are aware of each others bindings or home agent 208 may conclude from the location information which home agent has served mobile node 200 prior to changing the mobility management scheme, home agent 208 responds 606 to the DHAAD request by sending a DHAAD reply that indicates that it is not serving mobile node 200 and which includes a hint to the correct home agent (e.g., indicating home agent's 204 unicast, multicast or anycast address or its DNS name in a redirection information option).

Upon receiving the reply, mobile node 200 may optionally confirm that home agent 204 indicated as the serving home agent in the DHAAD reply is indeed the home agent where mobile node 200 has been registered by sending 607 another DHAAD request with its location information and its identifier to the address indicated in the DHAAD reply from home agent 208. Accordingly, home agent 204 will receive the DHAAD request and will reply 608 thereto indicating that it is indeed the home agent serving mobile node 200.

Mobile node 200 may proceed further with registering 609 its care-of address at home agent 204 using for example a binding update procedure as specified in IETF RFC 3775 (including for example the establishment of a IPsec security association with home agent 204 using the IKEv2 signaling procedure). Upon having updated the binding at home agent 204, mobile node 200 may continue 610 the session.

In the exemplary embodiment above described with respect to the DHAAD procedure, the DHAAD request is considered a home agent discovery message and the DHAAD reply is considered the response thereto. Accordingly, the term home agent discovery server in this exemplary embodiment refers to the home agent receiving the first DHAAD request.

Figure 7:
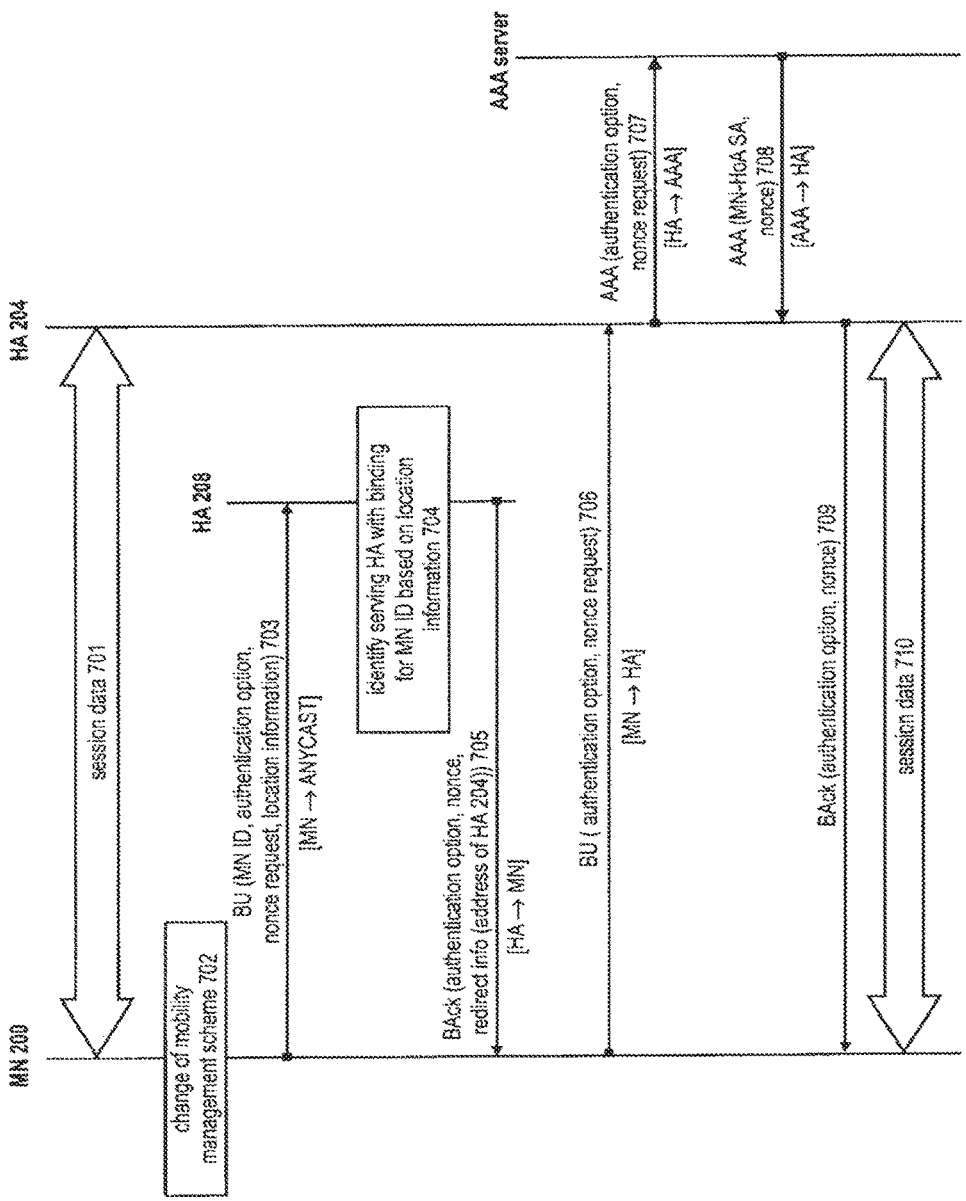
FIG. 7 shows an extended binding update procedure using an authentication option to discover a home agent where a mobile node is registered according to an exemplary embodiment of the invention.

In a further embodiment of the invention, the principles and ideas of the invention are applied to the binding update procedure using an authentication option of the authentication protocol as known from IETF RFC 4285 mentioned previously herein. This example will be outlined referring to FIG. 7 showing an extended binding update procedure using an authentication option according to this exemplary embodiment of the invention.

Again, it is assumed that mobile node 200 has 701 an ongoing session and changes 702 its mobility management protocol from Proxy MIPv6 to (Client) MIPv6 . Upon having configured a new care-of address (CoA), mobile node 200 transmits 703 a binding update (BU) message including an authentication option to an anycast address of the home agents in the core network. This binding update is extended with additional options comprising the location information of mobile node 200 and optionally an identifier of mobile node 200 as explained previously herein. The binding update is routed to home agent 208 in the core network region #2 (see FIG. 2). Home agent 208 recognizes that mobile node 200 is not registered at the home agent, and tries to identify 704 the home agent serving mobile node 200 using the location information in the binding update as explained earlier herein. Home agent 208 responds to the binding update by transmitting 705 a binding acknowledgement message to mobile node 200 indicating that the binding was not updated. Further, home agent 208 includes redirection information to the binding acknowledgement that is indicating the IP address of home agent 204 or its DNS name or information for the mobile node to derive those, which has been identified as the home agent serving mobile node 200 by home agent 208.

Mobile node 200 receives the binding acknowledgement including the redirection information with the address of home agent 204 and subsequently transmits 706 a new binding update to the address indicated in the binding acknowledgement received from home agent 208.

This new binding update may be a state-of the art binding update including an authentication option according to the authentication protocol, in case mobile node 200 has received unicast address of a home agent in the binding acknowledgment or has been able to obtain a unicast address of its serving home agent based on the redirection information included in the binding acknowledgment. This operation may for example be used if mobile node 200 is sure that the home agent address is identifying the correct home agent serving mobile node 200. If the mobile node is not certain that the new binding update is routed to its serving home agent (e.g., a group address is returned in the binding acknowledgement), mobile node 200 may send a binding update as in step 703 including location information and optionally an identifier of mobile node 200.

Assuming that home agent 204 is the home agent where mobile node 200 is registered, home agent 204 will process the binding update as specified in IETF RFC 4285 and will authenticate 707, 708 the binding update of mobile node 200 with a AAA server. If this authentication is successful, home agent 204 registers the new care-of address of mobile node 200 in its binding cache and confirms the update of the binding by sending 709 a binding acknowledgement (BAck) to mobile node 200. Accordingly, mobile node 200 may continue exchanging session data 710 of the session started prior to changing the mobility management scheme.

Figure 8:
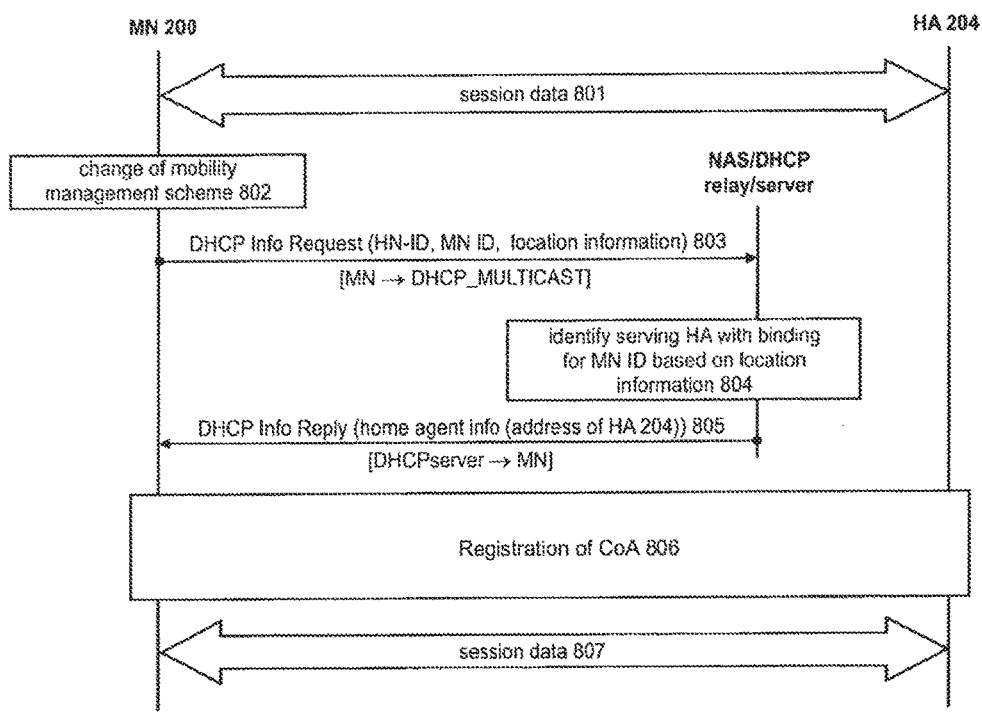
FIG. 8 shows an exemplary DHCP signaling to discover the home agent where a mobile node is registered according to an exemplary embodiment of the invention.

Another possibility according to another embodiment of the invention is to extend the DHCP protocol procedures. FIG. 8 shows an exemplary DHCP signaling to discover the home agent serving mobile node 200 according to an exemplary embodiment of the invention. Similar to the previous embodiments described so far, it is assumed for exemplary purposes that mobile node 200 has 801 an ongoing session and changes 802 its mobility management protocol from Proxy MIPv6 to (Client) MIPv6 . Mobile node 200 configures a new care-of address (CoA) upon changing the mobility management scheme. Mobile node 200 transmits 803 a DHCP Information Request message including an identifier of home network of its operator (which is typically preconfigured in the mobile node) so as to query the home agent serving the mobile node. In addition to the conventional parameters in the DHCP Information Request message (see Droms et al., "Dynamic Host Configuration Protocol for IPv6 (DHCPv6)", IETF RFC 3315, July 2003, and Hee Jin Jang et al., "DHCP Option for Home Information Discovery in MIPv6 ", IETF Internet Draft, draft-ietf-mip6-hiopt-10.txt, January 2008, both available at http://www.i-etf.org and incorporated herein by reference), mobile node 200 includes its location information and optionally one of its identifiers to the message in order to allow the receiving DHCP server (NAS relay) to potentially identify its serving home agent based on the location information. The DHCP Information Request message may be destined to a DHCP multicast address (DHCP_MULTICAST). The DHCP server receiving the request tries to identify 804 the home agent serving mobile node 200 based on the location information and the mobile node identifier. Assuming that the DHCP server is capable to identify the home agent where mobile node 200 is registered, it includes a home agent information option into the reply message (DHCP Information Reply) that is including the home agent address and sends 805 the reply message to mobile node 200.

Upon receiving the reply, mobile node 200 may proceed further with registering 806 its care-of address at home agent 204 whose address is being indicated in the DHCP reply using for example a binding update procedure as specified in IETF RFC 3775 (including for example the establishment of a IPsec security association with home agent 204 using the IKEv2 signaling procedure). Upon having updated the binding at home agent 204, mobile node 200 may continue 807 the session.

In this exemplary embodiment, the DHCP server (NAS relay) may be considered a home agent discovery server, and the terms home agent discovery message and response can be considered equivalent to the extended DHCP Information Request and Reply messages.

One problem that may occur in the scenarios considered herein is that the network may have relocated the home agent during the mobile node's movement within the Proxy Mobile IP domain. According to another embodiment of the invention, the mobile node may therefore store additional information about intermediate (access) networks to which the mobile node attached when moving. The mobile node may include these additional information to the location information when providing them to the network upon changing the mobility management scheme. For instance, the mobile node may guess that a home agent relocation has taken place and may hence store information about the current intermediate network, when it has moved a certain distance (e.g., measured from geographic location information, number of visited access routers, cells, etc.) or when it has moved across access networks or administrative domains.

The "wrong" home agent discovery server receiving the anycast home agent discovery message may for example maintain a database for mapping locations indicated by the mobile node to home agent addresses. The home agent discovery server can then reject the request and include a redirection hint such as a new anycast or unicast address or other identifiers for the correct home agent or the region where the correct home agent is likely located as discussed above. The mobile node may send a new home agent discovery message to the indicated address derived from the received hint.

In one exemplary implementation, a deployment concept may define multiple home agent anycast groups for different regions, services or access technologies. Different groups may have different scopes and the "wrong" home agent or home agent discovery server would hint the mobile node to another anycast group, which has a smaller or more specific scope. The mobile node could for example initially attach to a Proxy Mobile IP network in Shanghai (core network region #1 in FIG. 2) and get home agent 204 assigned. After traveling to Beijing (core network region #2 in FIG. 2), it initiates home agent discovery and sends an IKE message including information about the point of initial attach to the anycast address with the largest scope, e.g., the globally valid anycast address. Home agent 208 receives this message and replies with a hint derived from mobile node's local information, that the mobile node should try the more specific anycast group, e.g., an anycast address of the anycast group of the home agents in Shanghai (i.e., the home agents of core network region #1 in FIG. 2). The mobile node finally sends an IKE message to the anycast address of the Shanghai home agents and discovers the correct home agent (home agent 204) in this group.

In a further embodiment of the invention, the mobile node gives feedback to the wrong home agents about their hints. If, e.g., the mobile node tells a home agent not serving the mobile node that its previous hint was helpful in finding the correct home agent, the home agent not serving the mobile node may for example store this information in its database (i.e., the mapping of correct home agent address and reported previous attach locations of the mobile node) and improve its hinting process, so that future hints by this home agent for other mobile nodes get more precise.

Another problem that may need consideration in the system design is security. In some embodiments of the invention, the home agent discovery message contains a mobile node identifier, so that the receiver of the message is able to identify the mobile node's binding cache entry and the home agent where this mobile node is registered. However, it may be desirable that an off-path attacker cannot to find out the home agent where a mobile node is currently registered by just sending a home agent discovery message containing another mobile node's identifier, since otherwise the attacker could launch a targeted attack against a specific mobile node's home agent.

In one exemplary embodiment of the invention mobile node uses a temporary or pseudo identifier during home agent discovery, whose mapping to the real mobile node identity is only known by the mobile node and the network (and not to the attacker). This pseudo identifier can be negotiated between network and mobile node before the transition to (Client) Mobile IP, e.g., during initial attach or during a previous authentication. In IP networks, a pseudo NAI is a common temporary identifier for privacy protection and this identifier is typically negotiated between network and mobile node during network authentication. Accordingly, the mobile node may for example use this identifier for inclusion to the home agent discovery message. An alternative temporary or pseudo identifier may be the mobile node's TMSI which is also a negotiated temporary pseudo identifier used within GSM/UMTS/LTE communication networks.

According to one exemplary embodiment both network and mobile node could generate the pseudo NAI from the TMSI, which was negotiated in the 3GPP access between network and mobile node. For instance, the pseudo NAI could be constructed from the TMSI in the username part and the domain from the domain part (e.g., "TMSI@example.com"). If the mobile node is moving from a 3GPP network to a non-3GPP network, it may thus use a pseudo NAI without additional signaling or delay stemming from a pseudo NAI negotiation. As the TMSI of the mobile node is typically stored at the mobility management entity (MME) of the 3GPP network, the mobility management entity may transfer the TMSIs assigned to the mobile nodes to the home agents before the handover. This transfer may be for example realized directly between the mobility management entity and the home agents of via the AAA/HSS server, e.g., during network authentication.

According to another embodiment of the invention, another measure against the threat of discovering the home agent of any mobile node is to dynamically configure anycast addresses on the home agents. For instance, if every mobile node has a unique home agent discovery anycast address assigned and this address is only configured on the home agents during the time the mobile node moves from Proxy MIP to (Client) MIP, it is generally not possible for an attacker to identify a mobile node's home agent. It is only possible during the time the mobile node does the transition from Proxy MIP to (Client) MIP, which is generally difficult to find out by an off-path attacker.

In some of the embodiments of the invention described above, a home agent that has received a home agent discovery message but is not serving the mobile node, typically responds by a home agent discovery response including redirection information and the mobile node sends another home agent discovery message in response thereto. In a further embodiment, instead of rejecting the home agent discovery request message by the "wrong" home agent and sending a hint to the mobile node containing an address or region for the correct home agent, the home agent not serving the mobile node may forward the home agent discovery message towards the correct home agent address or region, and the home agent receiving the forwarded message may then reply to the mobile node if it is serving the mobile node or may again forward the home agent discovery message.

In order to not have the home agent discovery message forwarded between home agents without a response to the mobile node, in a variant of this embodiment, the home agent discovery message may include a counter option to count the number of times the message has been forwarded. If the counter exceeds a threshold (or reaches zero when decrementing the counter) the home agent that has received the home agent discovery message responds to the mobile node by sending a home agent discovery response message including a redirection option, if it is not serving the mobile node. The mobile node may then either interrupt the home agent discovery or may resend another home agent discovery message (including location information) based on the redirection hint in the response message.

Further it should be noted that although most of the previous embodiments discussed with respect to FIGS. 2 to 8 have assumed a mobility management change from Proxy MIP to Client MIP, it is also possible to use this invention for (Client) MIP to Proxy MIP handover as well. In this case, the mobile access gateway (acting as a proxy for the mobile node) may need to find out the home agent where the mobile node has registered before and may perform a home agent discovery. For instance, the mobile access gateway may for example query or be provided with information about previous mobile node locations from the mobile node, and may send home agent discovery messages including local information to the network to discover the home agent, as described previously herein.

Moreover, it is also noted that the anycast groups to which the home agents may be assigned can be changed dynamically by the operator, e.g., to adapt to the size of the network, the number of PDN-GWs or the number of mobile nodes registered at the network.

Another aspect of the invention is the optimization of a data path in scenarios where multiple anchors (e.g., a ePDG and a PDN-GW) are used for single data session. According to this further aspect of the invention, a similar approach as for the home agent discovery discussed above is used. The idea is to relocate the one of the anchor to a location closer to another anchor.

For example, in 3GPP SAE, where a UE (mobile node) located in a un-trusted non-3GPP network is typically anchored at a PDN-GW (home agent/local mobility anchor) for mobility management and additionally maintains a secure tunnel to an ePDG for accessing the 3GPP network. Further, it should be noted that the data path for session data from/to the UE (mobile node) in case the UE (mobile node) is located in an un-trusted network is to be routed through a secure tunnel to an ePDG in the core network and from this ePDG (through another secure tunnel) to the PDN-GW (home agent/local mobility anchor) serving the UE (mobile node). The PDN-GW establishes the connection to the Internet for the session data.

Figure 9:
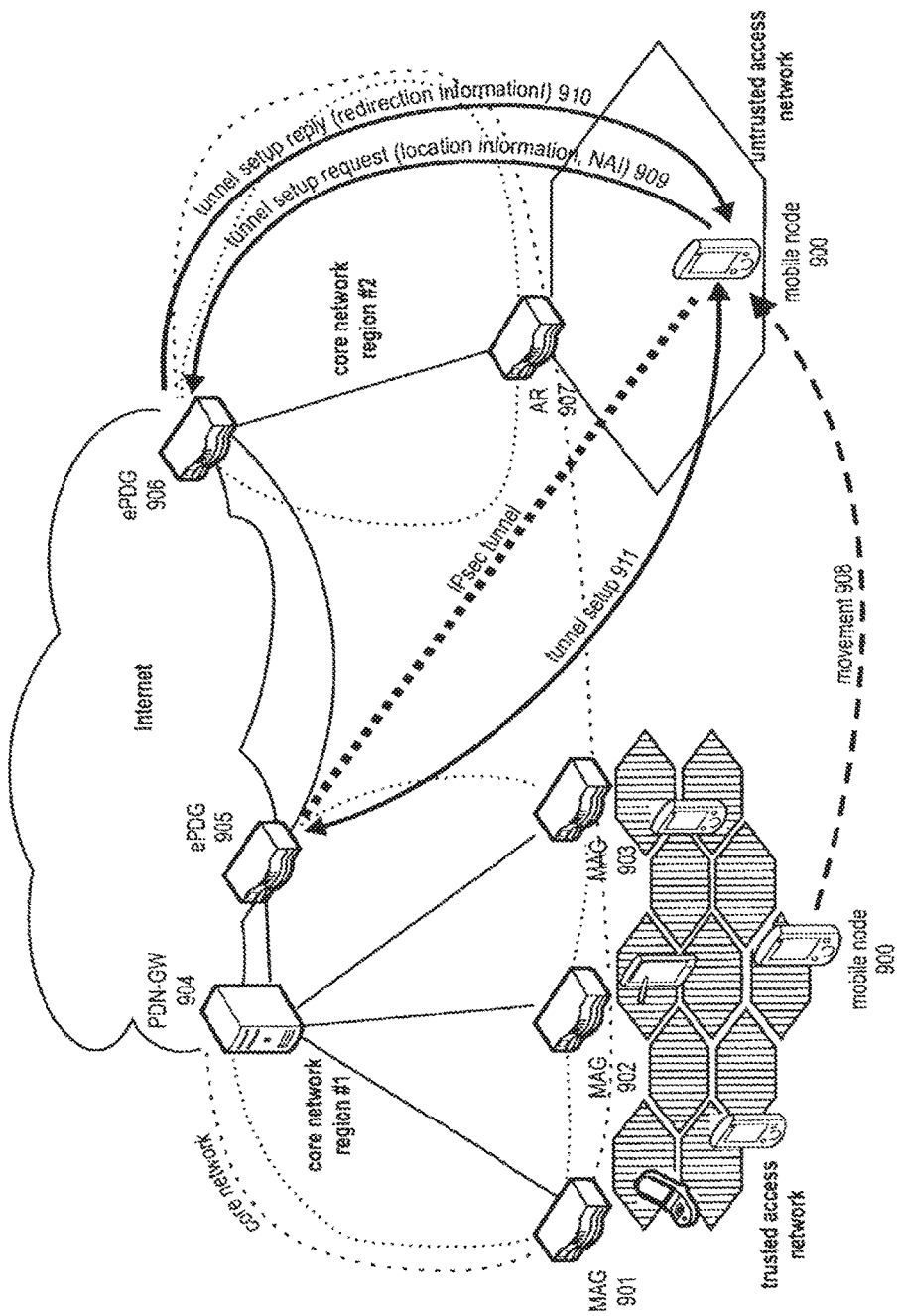
FIG. 9 shows an exemplary scenario according to a further aspect of the invention, where the data path for a mobile node is optimized after a movement from the mobile node from a trusted access network to an un-trusted access network.

An example scenario is shown in FIG. 9. The UE (mobile node 900) initially attaches to a trusted non-3GPP or 3GPP access network connected to the core network (region #1) and is assigned PDN-GW 904 (home agent). Both core network region #1 and core network region #2 are part of a single core network. It may be assumed that UE (mobile node 900) moves 908 to an un-trusted non-3GPP network (served by access router 907) that is also connected to the core network. Since the UE entered an un-trusted non-3GPP network, the UE (mobile node 900) typically start discovering and setting up 909 an IPsec tunnel to an ePDG (here ePDG 906). The UE (mobile node 900) includes location information about the initial attach location and an identifier in one of the initial messages sent to ePDG 906 for setting up the secure tunnel. For example, similar to the example discussed above with respect to FIG. 4, the UE (mobile node 900) may use the IKEv2 signaling procedure and may extend the IKE_SA_INIT message by including its location information and its identifier. ePDG 906 may identify the current mobile node's PDN-GW (PDN-GW 904) based on the location information and notices that the data path would be much shorter if the UE (mobile node 900) would use another ePDG (in this example ePDG 905). Hence, ePDG 906 may rejects 910 the IKE request and sends a hint to the UE (mobile node 900) to relocate or redirect the UE (mobile node 900) to ePDG 905. The UE (mobile node 900) then establishes the secure tunnel with ePDG 905 and thus establishes a shorter data path and which implies with shorter data packet delay.

As an optimization of the above procedure and according to another embodiment, the initially discovered ePDG (ePDG 906) may accept the IKE request, so that the UE (mobile node 900) can use this ePDG until the secure tunnel to the more optimal ePDG 905 is established and the UE (mobile node 900) is completely relocated to new ePDG 905. Accordingly, the reply 910 to the tunnel establishment request 909 may indicate to proceed further with the establishment of the tunnel and additionally includes the redirection hint to ePDG 905. This temporary connection to two ePDG might minimize the handover delay while still ensuring an optimized data path.

The data path optimization is independent from the type of mobility management used before and after the handover and does not need to involve changing the mobility management scheme). However, if (Client) MIP was used before the movement (handover), the UE already knows its current PDN-GW address (i.e., that of PDN-GW 904) and may include the PDN-GW's address in the IKE_SA_INIT message.

Alternatively, in another exemplary embodiment, the UE may also discover ePDG 905 by constructing a DNS name based on the known PDN-GW's DNS name. For instance, of the known PDN-GW name is "PDN-GW1.operator.de", then the DNS name to discover the ePDG address could be "ePDG.PDN-GW1.operator.de".

Another scenario where a common anchor may be discovered and used using the principles outlined above are situations where the mobile node has multiple independent attachments, connections or sessions to the network (e.g., a WLAN HTTP session and a LTE VoIP session). In such scenarios, it may be desirable to use the same anchor for all these sessions for efficiency reasons. When the mobile node discovers the home agent for an additional connection, it may include location information and an identifier of the mobile node to discover the very home agent that the mobile node already uses for other connections.

In another scenario, according to another exemplary embodiment of the invention, a UE (mobile node) is handing over to a new non-3GPP access network using client-based mobility management, but does not know whether this access network is a trusted non-3GPP network or an un-trusted non-3GPP network. Hence, it does not know whether it should discover an ePDG to setup an IPsec tunnel to this ePDG, to subsequently register with the PDN-GW through the ePDG tunnel or whether it can register with the PDN-GW directly without the need of a secure tunnel to an ePDG.

In this embodiment, the UE may assume that it is located in an un-trusted access network, and starts the establishment of secure tunnel (e.g., IPsec tunnel) with an ePDG by sending a tunnel setup message. This tunnel setup message may be for example an IKE_SA_INIT request message of the IKEv2 signaling procedure transmitted to the ePDG. Again this tunnel setup message is extended by incorporating location information as described previously herein. The tunnel setup message may use the new care-of address configured by the UE (mobile node) upon handover as the source address. The ePDG may notice (e.g., based on the source address of the IKE_SA_INIT request message or based on the location information in the message) that the UE (mobile node) is located in trusted or in an un-trusted non-3GPP access network. Based on this information, it can accept and proceed with the tunnel establishment or reject the tunnel setup request and redirect the UE (mobile node) to the PDN-GW serving the UE (mobile node) by sending a response message (e.g., IKE_SA_INIT reply message) including a hint to the UE's PDN-GW address, as described in various embodiments of this invention. The redirect information may additionally include the information that the redirect destination is a PDN-GW or home agent and not an ePDG, so that the mobile node can behave accordingly when contacting the redirect destination.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology and IETF terminology. However, the terminology and the description of the various embodiments with respect to IETF-based and 3GPP-based architectures is not intended to limit the principles and ideas of the inventions to such systems.

Also the detailed explanations given in the Technical Background section above are intended to better understand the mostly IETF specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

The invention claimed is:
1. A mobile node comprising:
a transmitter, which, responsive to the mobile node attached to a first node in a network-based mobility management scheme changing the mobile node's mobility management scheme to a client-based mobility management scheme, transmits an Internet Key Exchange (IKEv2) request message to a second node discoverable in the client-based mobility management scheme to establish a security association with the second node, wherein the IKEv2 request message includes a Network Access Identifier (NAI) of the mobile node having a network prefix assigned to the mobile node, and
a receiver, which, in operation, receives from the second node an IKEv2 response message including redirect information containing one of an IP address of the first node and hints, wherein the hints include at least one of an address prefix and a domain name and allow the mobile node to derive a valid address of the first node, the valid address including one of an anycast group address, a multicast group address, and a unicast address,
wherein the transmitter, responsive to the IKEv2 response message, transmits an IP address registration request to the first node, to which the mobile node is redirected, using one of the IP address of the first node and the hints contained in the redirect information to register a new address with the first node to establish a new security association with the first node,
wherein the second node is different from the first node and the first node is a first home agent, and
wherein the transmitter transmits a Mobile IP (MIPv6) Binding Update to the first home agent using the IP address contained in the redirect information included in the IKEv2 response message.
2. The mobile node according to claim 1, wherein the transmitter transmits the IKEv2 request message to the second node using an anycast address, a multicast address, or a unicast address.
3. A method performed by a mobile node comprising:
transmitting, responsive to the mobile node attached to a first node in a network-based mobility management scheme changing the mobile node's mobility management scheme to a client-based mobility management scheme, an Internet Key Exchange (IKEv2) request message to a second node discoverable in the client-based mobility management scheme to establish a security association with the second node, wherein the IKEv2 request message includes a Network Access Identifier (NAI) of the mobile node having a network prefix assigned to the mobile node,
receiving, from the second node, an IKEv2 response message including redirect information containing one of an IP address of the first node and hints, wherein the hints include at least one of an address prefix and a domain name and allow the mobile node to derive a valid address of the first node, the valid address including one of an anycast group address, a multicast group address, and a unicast address, and
transmitting, responsive to the IKEv2 response message, an IP address registration request to the first node, to which the mobile node is redirected, using one of the IP address of the first node and the hints contained in the redirect information to register a new address with the first node to establish a new security association with the first node, wherein the second node is different from the first node and the first node is a first home agent, and transmitting, from the mobile node, a Mobile IP (MIPv6) Binding Update to the first home agent using the IP address contained in the redirect information included in the IKEv2 response message.

4. The method according to claim 3, wherein the IKEv2 request message is transmitted to the second node using an anycast address, a multicast address, or a unicast address.

\* \* \* \* \*